US012326917B2

(12) United States Patent
Leidich et al.

(10) Patent No.: US 12,326,917 B2
(45) Date of Patent: Jun. 10, 2025

(54) SENSOR AND METHOD FOR GENERATING TRAINING DATA FOR A MACHINE LEARNING CLASSIFIER IN A SENSOR

(71) Applicant: Robert Bosch GmbH, Stuttgart (DE)

(72) Inventors: Stefan Leidich, Rutesheim (DE); Andreas Frischen, Leonberg (DE); Stefan Weiss, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 953 days.

(21) Appl. No.: 17/446,646

(22) Filed: Sep. 1, 2021

(65) Prior Publication Data

US 2022/0076070 A1    Mar. 10, 2022

(30) Foreign Application Priority Data

Sep. 4, 2020  (DE) .......................... 102020211164.2

(51) Int. Cl.
  *G06F 18/214*  (2023.01)
  *G06F 18/2415*  (2023.01)
  *G06N 20/00*  (2019.01)

(52) U.S. Cl.
  CPC ...... *G06F 18/2148* (2023.01); *G06F 18/2415* (2023.01); *G06N 20/00* (2019.01)

(58) Field of Classification Search
  None
  See application file for complete search history.

(56) References Cited

U.S. PATENT DOCUMENTS

| 6,434,540 B1* | 8/2002 | Numaoka | G06N 20/00 706/23 |
| 2018/0356771 A1* | 12/2018 | Basu | G05B 13/04 |
| 2019/0220697 A1* | 7/2019 | Kiemele | G06T 7/75 |

OTHER PUBLICATIONS

Bourke et al., "Fall detection algorithms for real-world falls harvested from lumbar sensors in the elderly population: A machine learning approach," 38th Annual International Conference of the IEEE Engineering in Medicine and Biology Society (EMBC), 2016, 4 Pages.

* cited by examiner

*Primary Examiner* — Nancy Bitar
(74) *Attorney, Agent, or Firm* — NORTON ROSE FULBRIGHT US LLP

(57) ABSTRACT

A sensor and a method for generating training data for a machine learning classifier in a sensor. The method includes: detecting a first sensor signal and a second sensor signal with the aid of the sensor; ascertaining whether the machine learning classifier classifies the first sensor signal as a predefined user motion pattern; ascertaining whether a classification model classifies the second sensor signal as a predefined user input for controlling a device, the user input being assigned to the user motion pattern; ascertaining a training data vector for the machine learning classifier if the second sensor signal has been classified as the predefined user input, and if the first sensor signal has not been classified as the user motion pattern, ascertaining a training data vector for the machine learning classifier, the training data vector including the first sensor signal as well as the user motion pattern.

11 Claims, 18 Drawing Sheets

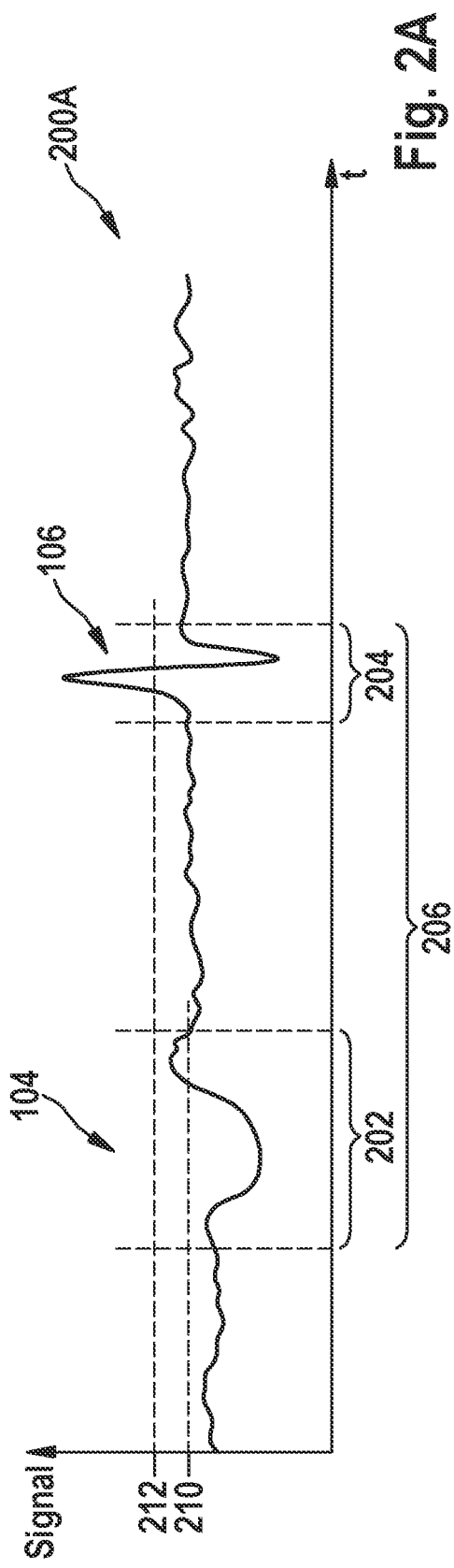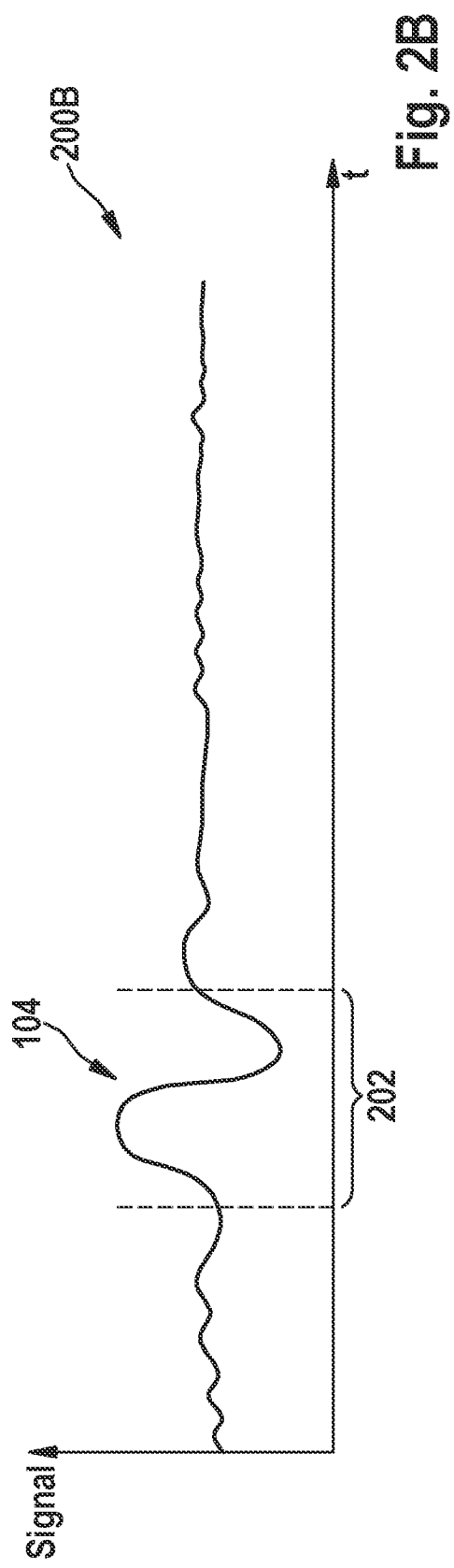

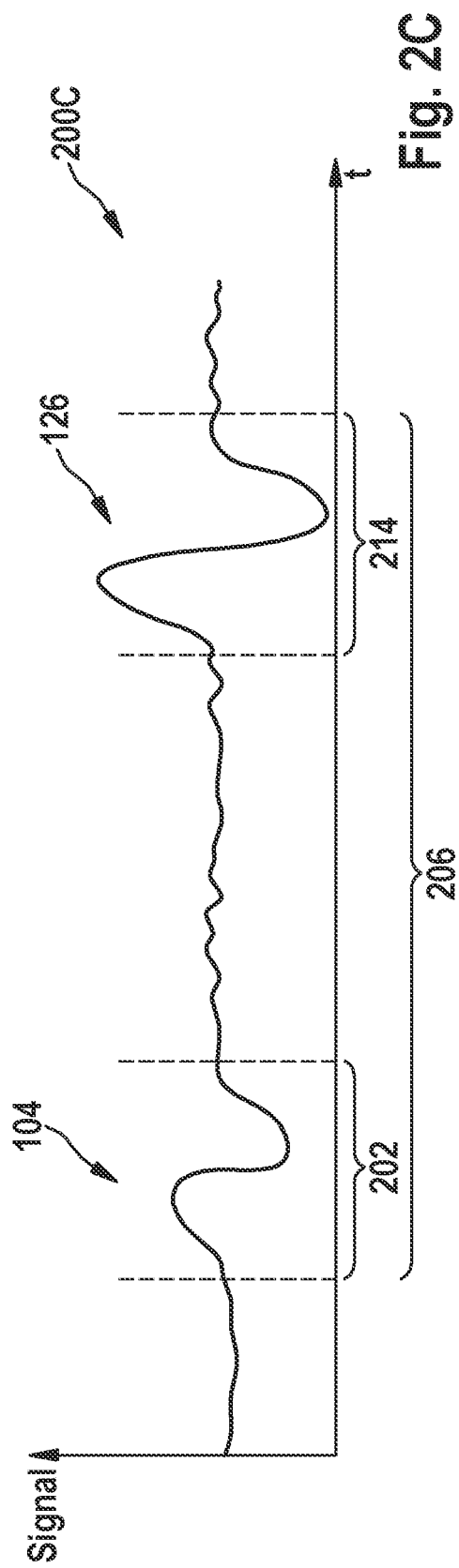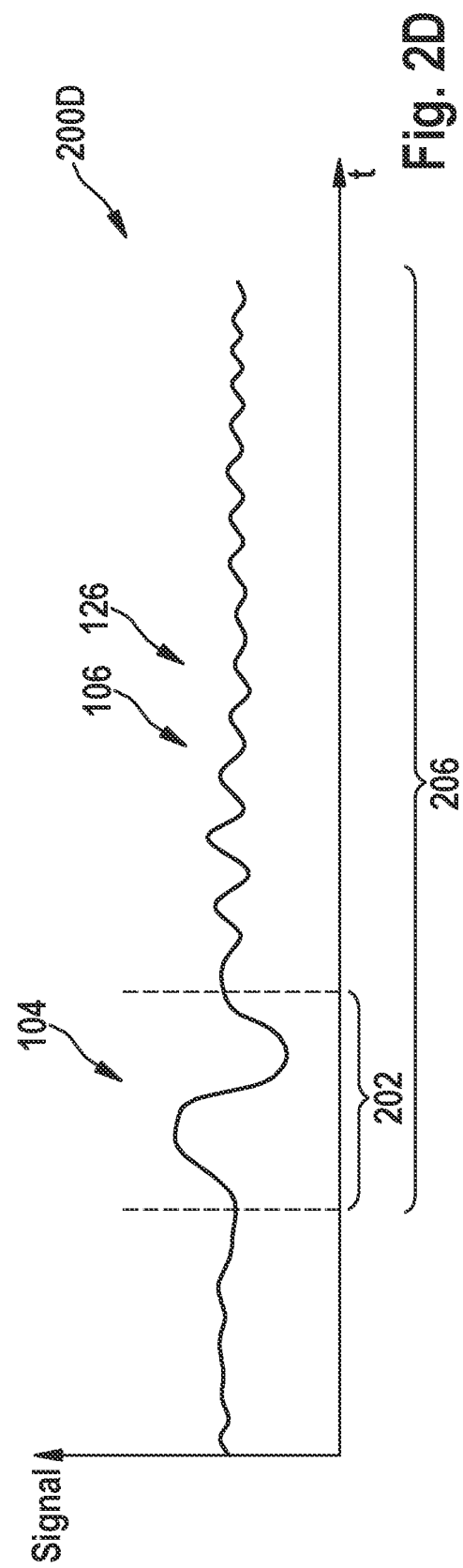

SENSOR AND METHOD FOR GENERATING TRAINING DATA FOR A MACHINE LEARNING CLASSIFIER IN A SENSOR

CROSS REFERENCE

The present application claims the benefit under 35 U.S.C. § 119 of German Patent Application No. DE 102020211164.2 filed on Sep. 4, 2020, which is expressly incorporated herein by reference in its entirety.

FIELD

Various specific embodiments relate in general to a sensor and to a method for generating training data for a machine learning classifier in a sensor.

BACKGROUND INFORMATION

Sensors are used in numerous devices such as, for example, in smartphones, various wearables (for example, devices worn on the body and/or on the head), intelligent headphones, etc. In such case, for example, intelligent sensors (or smart sensors) may be used, which are able to preprocess detected sensor signals. Detected sensor signals may be preprocessed, for example, with the aid of trained machine learning classifiers such as, for example, neural networks. The machine learning classifiers may have been trained with the aid of training data, which cover a broad user spectrum. For example, a machine learning classifier generalized in this manner may recognize motion patterns.

In Bourke et al., "Fall detection algorithms for real-world falls harvested from lumbar sensors in the elderly population: A machine learning approach," 38th Annual International Conference of the IEEE Engineering in Medicine and Biology Society (EMBC), 2016, a method is described for recognizing a risk of falling among elderly persons with the aid of machine learning.

SUMMARY

However, a user-specific behavior (for example, a motion pattern) may be different from a generalized behavior. It may therefore be necessary to train generalized machine learning classifiers in a user-specific manner. A user-specific training of a generalized machine learning classifier requires user-specific training data. It may therefore be further necessary to generate user-specific training data.

A method and sensor including the features of an example embodiment of the present invention may make it possible to generate training data for a machine learning classifier in the sensor during the use of the sensor in a device.

A machine learning classifier may be any type of classifier, which is able to be adapted (for example, trained) with the aid of machine learning. The machine learning classifier may, for example, be a decision tree, a random forest classifier, a gradient boosting classifier, a support vector machine (SVM), a k-nearest neighbor classifier (KNN), a neural network, etc. A neural network may include or be any type of neural network such as, for example, an autoencoder network, a convolutional neural network (CNN), a variational autoencoder network (VAE), a sparse autoencoder network (SAE), a recurrent neural network (RNN), a deconvolutional neural network (DNN), a generative adversarial network (GAN), a forward-thinking neural network, a sum-product neural network, etc. The neural network may include any number of layers. A pre-trained machine learning classifier may have been pre-trained with the aid of any type of training principle and the pre-trained machine learning classifier may be additionally trained with the aid of any type of training principle. For example, the machine learning classifier may be a neural network and a pre-trained neural network may have been trained with the aid of any type of training principle and the pre-trained neural network may be additionally trained with the aid of any type of training principle, such as backpropagation.

A classification model may be any type of model that is able to classify sensor data relating to a user input. The classification model may, in particular, be designed in such a way that it ascertains probability values for all decision possibilities (also referred to as "soft decision"). As illustrated, the classification model is able to recognize the presence of a user input. For example, the classification model may classify a sensor signal above a threshold value as user input. For example, the classification model may classify a sensor signal above a threshold value of an ascertained probability of a class (for example, of a class of a plurality of classes) as user input. According to various specific embodiments, the classification model may be a machine learning classifier as described in the preceding paragraph such as, for example, a neural network.

The generation of user-specific training data has the effect of a generalized pre-trained machine learning classifier being capable of being additionally trained specifically for the behavior (for example, motion patterns) of a user using the user-specific training data.

In accordance with an example embodiment of the present invention, the method according to the first example further has the effect of training data being capable of being ascertained for the service life of the device that interacts with the sensor.

The generated training data (for example, the ascertained training data vector) may, for example, be utilized to retrain a machine learning classifier (for example, the pre-trained machine learning classifier) with the aid of convention methods or methods described herein. This has the effect, for example, of future detections being capable of being improved upon with the aid of the retrained machine learning classifier. For example, the number of false positive and/or false negative classifications ascertained by the retrained machine learning classifier may be reduced.

The detection of the first sensor signal and of the second sensor signal with the aid of the sensor may include: detecting the first sensor signal in a first time range; and detecting the second sensor signal in a second time range, the first time range starting before the second time range. The features described in this paragraph in combination with the first example form a second example.

The sensor may include one first sensor element and one second sensor element. The detection of the first sensor signal and of the second sensor signal with the aid of the sensor may include: detecting the first sensor signal with the aid of the first sensor element; and detecting the second signal with the aid of the first sensor element and/or with the aid of the second sensor element. The features described in this paragraph in combination with the first example or the second example form a third example.

The first sensor element may detect a first physical variable and the second sensor may detect a second physical variable differing from the first physical variable. The features described in this paragraph in combination with the third example form a fourth example.

The first sensor element and/or the second sensor element may be a micromechanical sensor element. The feature described in this paragraph in combination with the third example or the fourth example form a fifth example.

The sensor may include one or multiple sensor elements selected from the group made up of: an acceleration sensor, a rotation rate sensor, a magnetic field sensor, a pressure sensor, a contact sensor. The features described in this paragraph in combination with one or with multiple of the first example through the fifth example form a sixth example.

The sensor may include a plurality of sensor elements; and the detection of the first sensor signal and of the second sensor signal with the aid of the sensor may include: detecting one or multiple first sensor signals with the aid of one or of multiple sensor elements of the plurality of sensor elements; and detecting one or multiple second sensor signals with the aid of one or of multiple sensor elements of the plurality of sensor elements. The ascertainment whether the machine learning classifier, in response to an input of the first sensor signal, classifies the first sensor signal as the predefined user motion pattern, may include: ascertaining whether the machine learning classifier, in response to the input of one or of multiple first sensor signals, classifies the one or multiple first sensor signals as the predefined user motion pattern. The ascertainment whether the classification model, in response to the input of the second sensor signal, classifies the second sensor signal as the predefined user input for controlling a device may include: ascertaining whether the classification model, in response to an input of the one or of the multiple second sensor signals, classifies the one or multiple second sensor signals as the predefined user input. The features described in this paragraph in combination with one through multiple of the first examples or with the sixth example form a seventh example.

The method may further include a transmission of instructions for controlling the device to the device if the second sensor signal has been classified as the predefined user input, and/or if the first sensor signal has been classified as the user motion pattern. The features described in this paragraph in combination with one or with multiple of the first example through the seventh example form an eighth example. For example, the ascertained training data vector may be stored exclusively in the sensor, the device being unable to access the training data vector. For example, the training data vector may be processed sensor-internally (for example, at the level of the sensor without the sensor interacting with the device). This has the effect, for example, of increasing the data protection of the user.

The method may further include: detecting a third sensor signal with the aid of the sensor; ascertaining whether the machine learning classifier, in response to an input of the third sensor signal, classifies the third sensor signal as the predefined user motion pattern; and transmitting the instructions for controlling the device to the device if the machine learning classifier classifies the third sensor signal as the user motion pattern. The features described in this paragraph in combination with one or with multiple of the first example through the eighth example form a ninth example.

The method may further include: storing the first sensor signal and the second sensor signal in a ring memory: The feature described in this paragraph in combination with one or with multiple of the first example through the ninth example forms a tenth example.

The detection of the first sensor signal and of the second sensor signal with the aid of the sensor may include: detecting a first measuring signal with the aid of the sensor; ascertaining the first measuring signal as the first sensor signal if a signal strength of the first measuring signal is greater than a predefined signal threshold value; detecting a second measuring signal with the aid of the sensor; ascertaining the second measuring signal as the second sensor signal if a signal strength of the second measuring signal is greater than the predefined signal threshold value. The features described in this paragraph in combination with one or with multiple of the first example through the tenth example form an eleventh example.

The ascertainment whether the machine learning classifier, in response to an input of the first sensor signal, classifies the first sensor signal as a predefined user motion pattern may include: ascertaining whether the machine learning classifier, in response to an input of the first sensor signal, classifies the first sensor signal as one predefined user motion pattern of a plurality of predefined user motion patterns; the ascertainment whether the classification model, in response to the input of the second sensor signal, classifies the second sensor signal as a predefined user input for controlling a device including: ascertaining whether the classification model, in response to the input of the second sensor signal, classifies the second sensor signal as one predefined user input of a plurality of predefined user inputs for controlling a device, each user input of the plurality of user inputs being assigned to one user motion pattern of the plurality of user motion patterns, the training data vector being ascertained if the second sensor signal has been classified as the user input of the plurality of predefined user inputs, and if the first sensor signal has not been classified as the user motion pattern assigned to the ascertained user input. The features described in this paragraph in combination with one or with multiple of the first example through the eleventh example form a twelfth example.

The ascertainment whether the machine learning classifier, in response to an input of the first sensor signal, classifies the first sensor signal as a predefined user motion pattern may include: ascertaining, in response to an input of the first sensor signal into the machine learning classifier, a probability of every predefined user motion pattern of a plurality of predefined user motion patterns; if the probability ascertained for a user motion pattern of the plurality of user motion patterns is greater than a predefined first probability threshold value, ascertaining the first sensor signal as the predefined user motion pattern. The features described in this paragraph in combination with one or with multiple of the first example through the twelfth example form a thirteenth example.

The method may further include: detecting a third sensor signal with the aid of the sensor; ascertaining, in response to an input of the third sensor signal into the machine learning classifier, a probability of every predefined user motion pattern of a plurality of predefined user motion patterns; the training data vector for the machine learning classifier being ascertained, if: in response to the input of the third sensor signal into the machine learning classifier, a probability ascertained for a user motion pattern of the plurality of user motion patterns is greater than the predefined first probability threshold value and, in response to the input of the first sensor signal into the machine learning classifier, the probability ascertained for the user motion pattern is lower than the predefined first probability threshold value and is greater than a predefined second probability threshold value. The features described in this paragraph in combination with the thirteenth example form a fourteenth example.

The training data vector for the machine learning classifier may be ascertained if: the second sensor signal has not been classified as the user input, in response to the input of the first sensor signal into the machine learning classifier, the probability ascertained for the user motion pattern of the plurality of user motion patterns assigned to the user input is lower than the predefined first probability threshold value and is greater than a predefined second probability threshold value, in response to the input of the third sensor signal into the machine learning classifier, the probability ascertained for the user motion pattern of the plurality of user motion patterns assigned to the user input is greater than the predefined first probability threshold value. The features described in this paragraph in combination with the fourteenth example form a fifteenth example.

The method may further include: storing the training data vector in a FIFO memory. The feature described in this paragraph in combination with one or with multiple of the first example through the fifteenth example forms a sixteenth example.

The machine learning classifier may be a pre-trained machine learning classifier. The feature described in this paragraph in combination with one or with multiple of the first example through the sixteenth example forms a seventeenth example.

The method may further include: additional training of the machine learning classifier using the training data vector. The feature described in this paragraph in combination with the seventeenth example forms an eighteenth example. The additional training may be carried out sensor-internally (for example, with the aid of a local learning). This has the effect of increasing the data protection of the user.

The additional training of the machine learning classifier using the training data vector may include: ascertaining, in response to an input of the first sensor signal assigned to the training vector into the machine learning classifier, a probability of every predefined user motion pattern of a plurality of predefined user motion patterns; ascertaining with the aid of a loss function a loss value using the user motion pattern assigned to the training vector and the probability for the user motion pattern ascertained with the aid of the machine learning classifier; additional training of the machine learning classifier in such a way that a loss value ascertained with the aid of a loss function using the training data vector is reduced. The features described in this paragraph in combination with the eighteenth example form a nineteenth example.

The additional training of the machine learning classifier using the training data vector may include: ascertaining, in response to an input of the first sensor signal assigned to the training data vector, a probability of every predefined user motion pattern of a plurality of predefined user motion patterns; ascertaining, with the aid of a loss function a loss value using the user motion pattern assigned to the training data vector and the probability for the user motion pattern ascertained with the aid of the machine learning classifier; and additional training of the machine learning classifier using the ascertained loss value. The features described in this paragraph in combination with the eighteenth example or with the nineteenth example form a twentieth example.

The detection of the first sensor signal and of the second sensor signal with the aid of the sensor may include: detecting the first sensor signal in a first time range, and detecting the second sensor signal in a second time range, the first time range starting before the second time range. The additional training of the machine learning classifier using the training data vector may include: preprocessing the first sensor signal assigned to the training vector in such a way that the first time range of the first sensor signal is reduced to a time range, which is shorter than the first time range; additional training of the machine learning classifier using the preprocessed first sensor signal and the user motion pattern assigned to the training data vector. The features described in this paragraph in combination with one or with multiple of the eighteenth example through the twentieth example form a twenty-first example.

The training data vector may be a false-negative training data vector. The ascertainment whether the machine learning classifier, in response to an input of the first sensor signal, classifies the first sensor signal as a predefined user motion pattern may include: ascertaining, in response to an input of the first sensor signal into the machine learning classifier, a probability of every predefined user motion pattern of a plurality of predefined user motion patterns; if the probability ascertained for one user motion pattern of the plurality of user motion patterns is greater than a predefined first probability threshold value, ascertaining the first sensor signal as the predefined user motion pattern; the method further including: if the second sensor signal has not been classified as the user input, and if the probability ascertained for the user motion pattern of the plurality of user motion patterns assigned to the user input is lower than the predefined first probability threshold value and is greater than a predefined second probability threshold value, ascertaining a false-positive training data vector for the machine learning classifier, the false-positive training data vector including the first sensor signal as well as the user motion pattern assigned to the user input. The features described in this paragraph in combination with one or with multiple of the first example through the twenty-first example form a twenty-second example.

The method may further include: detecting a third sensor signal with the aid of the sensor; ascertaining, in response to an input of the third sensor signal into the machine learning classifier, a probability of every predefined user motion pattern of a plurality of predefined user motion patterns; the false-positive training data vector for the machine learning classifier being ascertained, if: the second sensor signal has not been classified as the user input, in response to the input of the first sensor signal into the machine learning classifier, the probability ascertained for the user motion patterns of the plurality of user motion patterns assigned to the user input is lower than the predefined first probability threshold value and is greater than the predefined second probability threshold value and, in response to the input of the third sensor signal into the machine learning classifier, the probability ascertained for the user motion pattern of the plurality of user motion patterns assigned to the user input is lower than the predefined first probability threshold value. The features described in this paragraph in combination with the twenty-second example form a twenty-third example.

The method may further include: storing the false-positive training data vector in an additional FIFO memory. The features described in this paragraph in combination with the twenty-second example or with the twenty-third example form a twenty-fourth example.

The method may further include: additional training of the machine learning classifier using the false-positive training data vector and/or the false-negative training data vector. The features described in this example in combination with one or with multiple of the twenty-second example through the twenty-fourth example form a twenty-fifth example.

The method may further include: ascertaining whether the device is in a sleep mode and/or in a battery charging mode; the machine learning classifier being additionally trained using the false-positive training data vector and/or the false-negative training data vector, if the device is in the sleep mode and/or in the battery charging mode. The features described in this paragraph in combination with the twenty-fifth example form a twenty-sixth example.

A computer program product may store computer instructions which, if they are executed, carry out the method according to one or to multiple of the first example through the twenty-sixth example. The computer program product including the features described in this paragraph forms a twenty-sixth example.

A non-volatile memory medium may store program instructions which, if they are executed, carry out the method according to one or to multiple of the first example through the twenty-sixth example. The non-volatile memory medium including the features described in this paragraph forms a twenty-eighth example.

A non-volatile memory medium may store program instructions which, if they are executed, carry out the method according to one or to multiple of the first example through the twenty-sixth example. The non-volatile memory medium including the features described in this paragraph forms a twenty-ninth example.

A sensor may include: one or multiple sensor elements, which are configured to detect one first sensor signal and one second sensor signal; a computer, which is configured, in response to an input of the first sensor signal into a machine learning classifier, to ascertain whether the machine learning classifier classifies the first sensor signal as a predefined user motion pattern; in response to an input of the second sensor signal into a classification model, to ascertain whether the classification model classifies the second sensor signal as a predefined user input for controlling a device, the user input being assigned to the user motion pattern; to ascertain a training data vector for the machine learning classifier if the second sensor signal has been classified as the predefined user input, and if the first sensor signal has not been classified as the user motion pattern, the training data vector including the first sensor signal as well as the user motion pattern. The sensor including the features described in this paragraph forms a thirty-first example.

The computer may further be configured to train the machine learning classifier using the training data vector. The features described in this paragraph in combination with the thirtieth example or with the thirty-first example form a thirty-second example.

An interface, which is configured to transmit instructions for controlling the device to an execution unit of the device. The features described in this paragraph in combination with one or with multiple of the thirtieth example through the thirty-second example form a thirty-third example.

The computer may further be configured to ascertain whether the device is in a sleep mode and/or in a battery charging mode; and the computer may be configured to train the machine learning classifier using the training data vector if the device is in the sleep mode and/or in the battery charging mode. The features described in this paragraph in combination with the thirty-third example form a thirty-fourth example.

The computer may further be configured to transmit instructions to the execution unit with the aid of the interface, if the first sensor signal has been classified as the user motion pattern, the instructions being assigned to the user motion pattern; and/or if the second sensor signal has been classified as the user input, the instructions being assigned to the user input. The features described in this paragraph in combination with the thirty-third example or with the thirty-fourth example form a thirty-fifth example.

A system may include the sensor according to one or to multiple of the thirty-third example through the thirty-fifth example. The system may further include an execution unit, which is configured to receive the instructions from the sensor and to carry out one or multiple control actions assigned to the received instructions. The system including the features described in this paragraph forms a thirty-sixth example.

BRIEF DESCRIPTION OF THE DRAWINGS

Exemplary embodiments of the present invention are represented in the figures and explained in greater detail in the following description.

FIGS. 2A through 2E show exemplary detected signals according to various specific embodiments of the present invention.

DETAILED DESCRIPTION OF EXAMPLE EMBODIMENTS

In one specific embodiment, a "computer" may be understood to mean any type of logic-implementing entity, which may be hardware, software, firmware or a combination thereof. In one specific embodiment, a "computer" may therefore be a hardwired logic circuit or a programmable logic circuit such as, for example, a programmable processor, for example, a microprocessor (for example, a CISC (processor having a large instruction set) or a RISC (processor having a reduced instruction set)). A "computer" may also be software, which is implemented or executed by a processor, for example, any type of computer program, for example, a computer program that uses a virtual machine code such as, for example, Java. Any other type of implementation of the respective functions, which are described in greater detail below, may be understood as a "computer" in accordance with an alternative specific embodiment.

Intelligent sensors are able to detect motion patterns of users with the aid of a machine learning classifier generalized to a large number of users. However, a user-specific motion pattern may differ from the generalized motion pattern. It may therefore be necessary to train generalized machine learning classifiers in a user-specific manner. User-specific training of a generalized machine learning classifier requires user-specific training data. It may therefore further be necessary to generate user-specific training data. Various exemplary embodiments relate to a device and to a method for generating training data for a machine learning classifier in a sensor during the use of the sensor in a device. As illustrated, a device may include a sensor that includes a pre-trained machine learning classifier and during the use of the device by a user, the machine learning classifier may be additionally trained specifically for this user.

FIGS. 1A through 1M show a sensor 100 according to various specific embodiments. Sensor 100 may, for example, be an intelligent sensor (for example, a smart sensor).

Figure 1A:
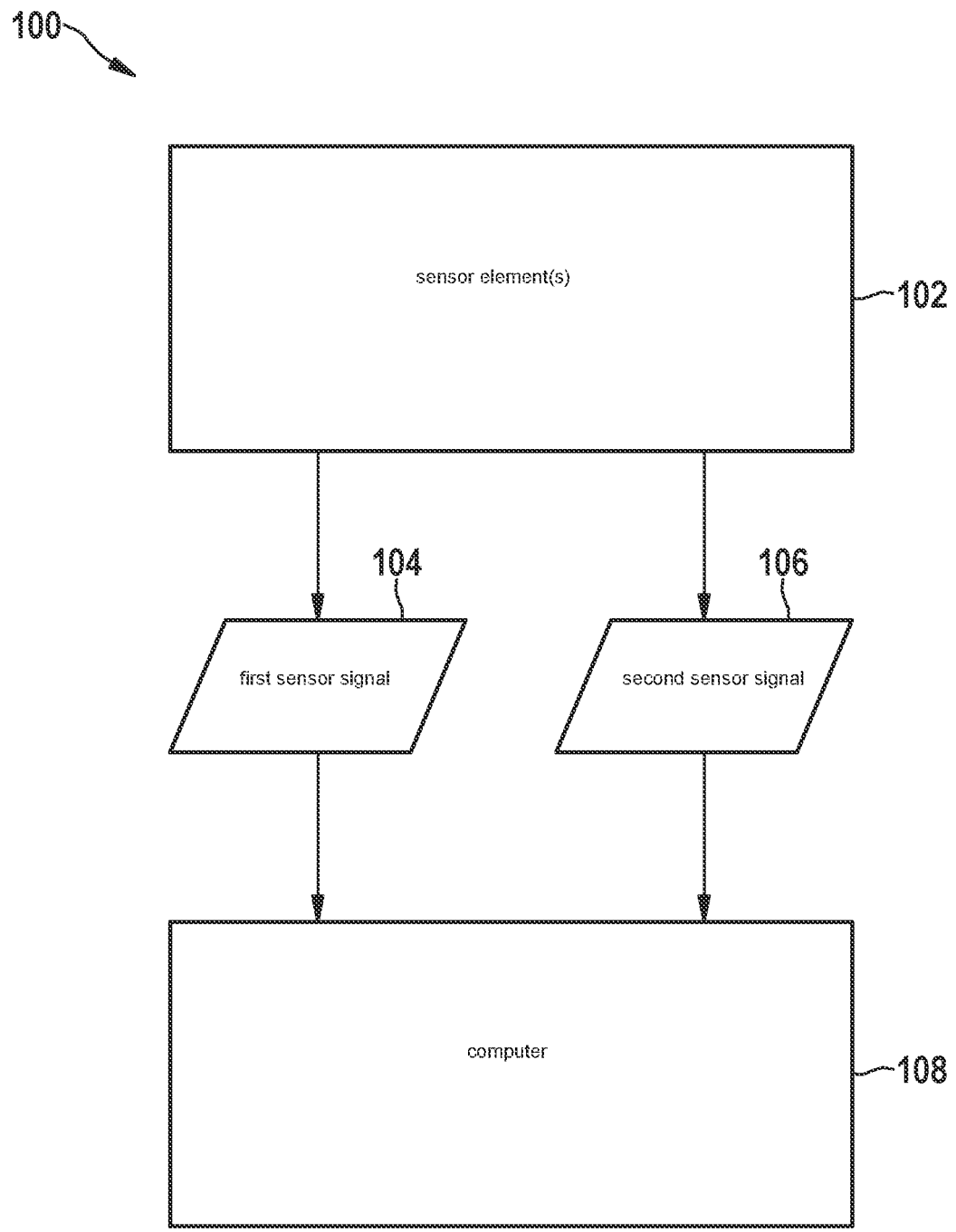
FIGS. 1A through 1M show a sensor according to various specific embodiments of the present invention.

FIG. 1A represents a sensor 100 according to various specific embodiments. Sensor 100 may include one or multiple sensor elements 102. For example, sensor 100 may include one or multiple sensor elements 102 selected from the group made up of: an acceleration sensor, a rotation rate sensor, a magnetic field sensor, a pressure sensor, a contact sensor, etc. For example, the acceleration sensor may be configured to ascertain an acceleration in each of the three spatial directions (for example an acceleration vector). For example, the rotation rate sensor may be configured to ascertain a rotation rate in each of the three spatial directions (for example, a rotation rate vector). For example, the magnetic field sensor may be configured to ascertain a magnetic field (for example, a change of magnetic field) in each of the three spatial directions (for example, a magnetic field vector). For example, the pressure sensor may be configured to detect a pressure (for example, a scalar pressure value). According to various specific embodiments, at least one sensor element of the one or multiple sensors 102 may be a micromechanical sensor element.

The one or multiple sensor elements 102 may be configured to detect a first sensor signal 104. The one or multiple sensor elements 102 may be configured to detect a second sensor signal 104. The one or multiple sensor elements 102 may be configured to detect first sensor signal 104 in a first time range. The one or multiple sensor elements 102 may be configured to detect second sensor signal 106 in a second time range. The first time range may start before the second time range. For example, a start of the second sensor signal 106 may be after the start of first sensor signal 104. According to various exemplary embodiments, second sensor signal 106 may be detected after first sensor signal 104.

Sensor 100 may further include a computer 108. Computer 108 may, as described above, include any type of logic-implementing entity. For example, computer 108 may include one or multiple processors. Computer 108 may be configured to process the sensor signals (for example, first sensor signal 104, for example, second sensor signal 106) detected by the one or multiple sensor elements 102. According to various specific embodiments, the one or multiple sensors 102 may be configured to provide digital sensor signals and computer 108 may be configured to process the digital sensor signals.

Figure 1B:
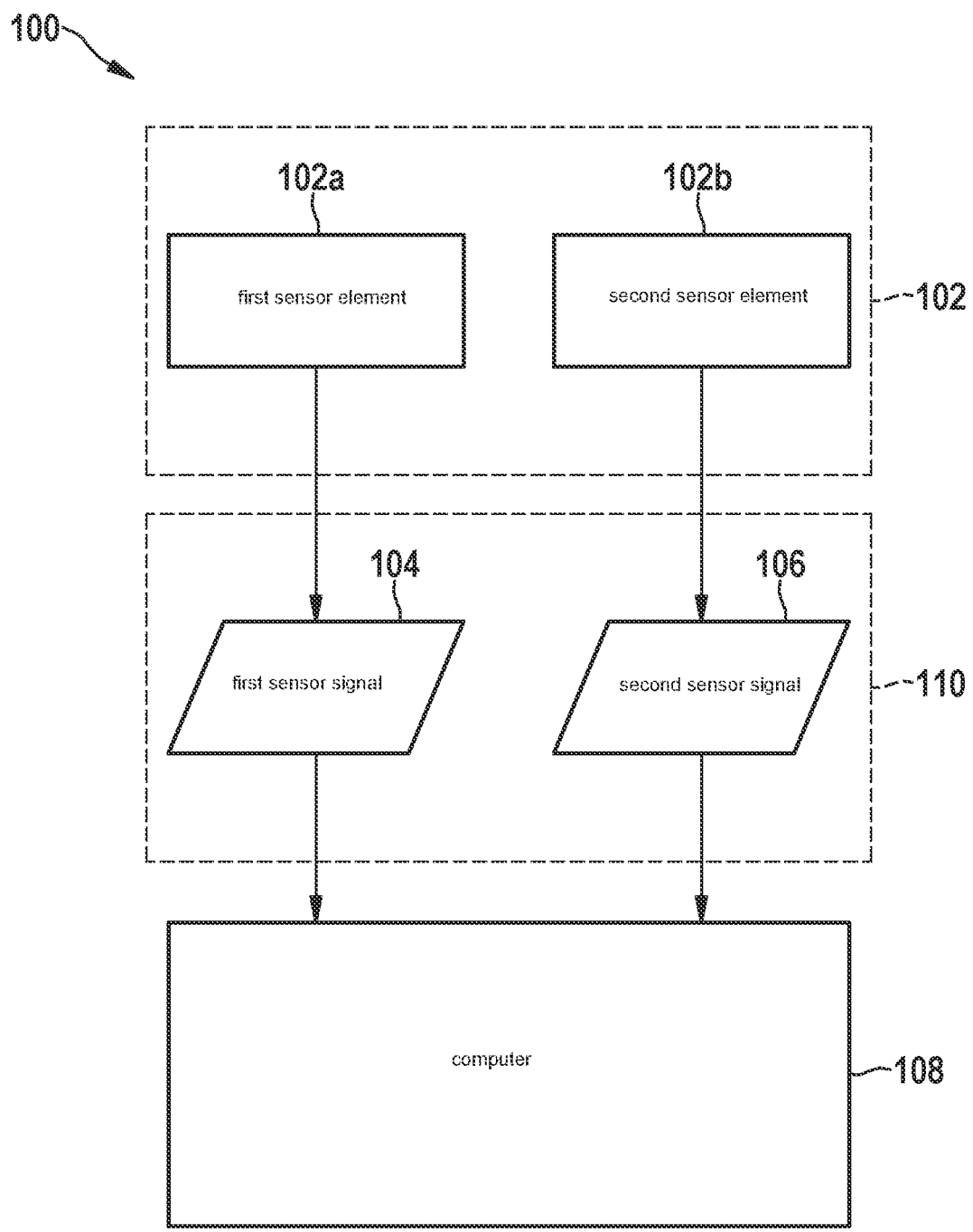

Referring to FIG. 1B, the one or multiple sensor elements 102 may include one first sensor element 102a and one second sensor element 102b. First sensor element 102a may be configured to detect first sensor signal 104. Second sensor element 102b may be configured to detect second sensor signal 106. According to various specific embodiments, first sensor element 102a may be configured to detect a first physical variable (for example, an acceleration, for example, a rotation rate, for example, a magnetic field). Second sensor element 102b may be configured to detect a second physical variable (for example, an acceleration, for example, a pressure, for example a temperature change). The second physical variable may differ from the first physical variable.

According to various specific embodiments, the one or multiple sensor elements 102 may include a plurality of sensor elements. For example, the one or multiple sensor elements 102 may include a plurality of first sensor elements and a plurality of second sensor elements. Each first sensor element of the plurality of first sensor elements may detect a first sensor signal 104. One or multiple of the first sensor elements of the plurality of first sensor elements may detect a physical variable differing from one another. Each second sensor element of the plurality of second sensor elements may detect a second sensor signal 106. One or multiple of the second sensor elements of the plurality of second sensor elements may detect a physical variable differing from one another.

The exemplary embodiments are described below with reference to first sensor signal 104 and second sensor signal 106. It is noted, however, that a plurality of first sensor signals (which are detected, for example, with the aid of the plurality of first sensor elements) and/or a plurality of second sensor signals (which are detected, for example, with the aid of the plurality of second sensor elements) may be used. For example, a processing for the plurality of first sensor signals described below for first sensor signal 104 may be carried out (for example, jointly such as, for example a processing of all first sensor signals of the plurality of first sensor signals with the aid of a machine learning classifier, for example, successively, each first sensor signal of the plurality of first sensor signals capable of being processed in accordance with first sensor signal 104). For example, a processing for the plurality of second sensor signals described below for second sensor signal 106 may be carried out (for example, jointly such as, for example, a processing of all second sensor signals of the plurality of second sensor signals with the aid of a classification model, for example, successively, each second sensor signal of the plurality of second sensor signals being capable of being processed in accordance with second sensor signal 106). It is further noted that this applies also to the third sensor signal described herein.

First sensor signal 104 may be assigned to a user motion pattern (for example, a gesture). For example, first sensor element 102a may include an acceleration sensor, a rotation rate sensor, a magnetic field sensor or a pressure sensor. For example, a device may include sensor 100 and device 100 may be connected to a user in such a way (for example, worn by the user such as, for example, a smartwatch), that a first sensor signal 104 (for example, an activation gesture of the smartwatch) detected with the aid of first sensor element 102a results from a motion of the user. Second sensor signal 106 may be assigned to a user input (for example, an input of the user detected with the aid of a sensor element). For example, the user input may be detected with the aid of the acceleration sensor. For example, the device may include an input unit such as, for example, a touch-sensitive screen, one or multiple keys, one or multiple buttons, etc., and the user may provide an input with the aid of the input unit. For example, the input of the user may be detected with the aid of second sensor element 102b as second sensor signal 106. According to various specific embodiments, second sensor element 102b may detect a user input (for example, an input detected with the aid of the acceleration sensor, for example, a pressing of a key, for example, a touching of a touch-sensitive screen) with high accuracy. For example, a detection of a second sensor signal 106 with the aid of second sensor element 102b may be very reliably (for example, uniquely) assigned to a user input (for example, second sensor signal 106 detected as a result of a user input with the aid of the acceleration sensor has a higher signal strength compared to a motion pattern, for example, second sensor signal 106 is detected with the aid of a touch-sensitive screen if the touch-sensitive screen is touched, and is not detected if the touch-sensitive screen is not touched, for example, second sensor signal 106 is detected if the touch-sensitive screen is touched and is not detected if the touch-sensitive screen is not touched).

According to various specific embodiments, sensor 100 may include a first memory device 110. First memory device 110 may be configured to store sensor signals (for example, first sensor signal 104, for example, second sensor signal 106). First memory device 110 may include at least one memory. A memory used in the specific embodiments may be a volatile memory, for example, a DRAM (dynamic random access memory), or a non-volatile memory, for example, a PROM (programmable read-only memory), an EPROM (erasable programmable read-only memory), an EEPROM (electrically erasable programmable read-only memory) or a flash memory such as for example, a memory unit including a floating gate, a charge trapping memory unit, a MRAM (magnetoresistive random-access memory) or a PCRAM (phase-change random-access memory). First memory device 110 may be configured to store the sensor signals and to provide the sensor signals to computer 108. According to various specific embodiments, first memory device 110 may be a ring memory. The ring memory may be configured to continuously store signals detected by the one or multiple sensor elements 102. The ring memory may be configured to overwrite the signals in the ring memory detected by the one or multiple sensor elements 102 after a predefined period of time and/or as a function of a predefined maximum memory usage of the ring memory. For example, the ring memory may be configured to store the detected signals for up to approximately 20 seconds (for example, for up to approximately 10 seconds).

According to various specific embodiments, the one or multiple sensor elements 102 may detect a continuous signal. For example, sensor 100 may be configured to continuously detect and process a signal (for example, for recognizing a user motion pattern and/or a user input). For example, the continuous signal may be detected at a frequency of approximately 10 kHz to approximately 1 kHz. For example, the continuous signal may be provided as a digital signal. For example, a digital value (for example, having a resolution of approximately 8 bits to approximately 16 bits) may be provided for a physical variable detected with the aid of the one or multiple sensor elements 102.

According to various specific embodiments, each sensor element of the one or multiple sensor elements 102 may detect a continuous signal. For example, sensor 100 may be configured to continuously detect and process a signal with the aid of each sensor element of the one or multiple sensor elements 102 (for example, for recognizing a user motion pattern and/or a user input). For example, each sensor element of the one or multiple sensor elements 102 may detect a physical variable different from one or multiple other sensor elements of the one or multiple sensor elements 102.

Computer 108 may be configured to ascertain in predefined time intervals (for example, at a predefined clock pulse) the signal of the continuous signal within a predefined past time range as a sensor signal. Computer 108 may be configured to ascertain the signal at a predefined clock pulse selected from a range of approximately 10 Hz to approximately 10 kHz (for example at a clock pulse of 100 Hz, for example, at a clock pulse of 1 kHz). The past time range may, for example, be selected from a range of approximately 0.5 s to approximately 10 s (for example at a clock pulse of 10 Hz, for example at a clock pulse of 1 kHz). According to various specific embodiments, the past time range may be selected as a function of an average time period of a user motion pattern to be detected (for example, in a range of approximately 1 second to approximately 3 seconds). According to various specific embodiments, the past time range may be selected as a function of an average time period of a user input to be detected. For example, a first past time range may be selected for first sensor element 102*a* as a function of the average time period of the user motion pattern to be detected. For example, a second past time range may be selected for second sensor element 102*b* as a function of the average time period of the user input to be detected. According to various specific embodiments, the ascertainment of the sensor signals may be a sliding window method. For example, the predefined clock pulse may be less than the predefined past time range, so that successively ascertained sensor signals may include at least partially overlapping time ranges.

Exemplary sensor signals are represented in FIGS. 2A through 2E. To illustrate sensor 100, reference is made in the description thereof to these exemplary sensor signals. It is noted that the one or multiple sensor elements 102 is/are able to provide any type of first sensor signal 104 assigned to a user motion pattern and any type of second sensor signal 106 assigned to a user input.

FIG. 2A shows a graph 200A of a signal detected by the one or multiple sensor elements 102 as a function of time. For example, the signal shown in graph 200A may be a superposition of multiple signals, which are detected by multiple sensor elements of the one or multiple sensor elements 102. For example, the signal shown may be assigned to various physical variables. According to various specific embodiments, a sensor element of the one or multiple sensor elements 102 may be configured to detect a signal (for example, a measuring signal) and to ascertain the detected signal as a sensor signal if a signal strength of the signal is greater than a predefined signal threshold value. For example, first sensor element 102*a* may ascertain first sensor signal 104 if the signal strength of the signal detected with the aid of first sensor element 102*a* is greater than a predefined first signal threshold value 210. For example, first sensor element 102*a* may detect the detected signal regardless of the signal strength as first sensor signal 104 (for example, features of detected first sensor signal 104 may be ascertained with the aid of a feature extraction as described herein with reference to FIG. 1C). For example, first sensor element 102*a* may detect first sensor signal 104 in a first time range 202. For example, second sensor element 102*b* may ascertain second sensor signal 106 if the signal strength of the signal detected with the aid of second sensor element 102*b* is greater than a predefined second signal threshold value 212. According to various specific embodiments, each sensor element of the one or multiple sensor elements 102 may be assigned a predefined signal threshold value (for example, as a function of a sensor type of the respective sensor element). For example, second sensor element 102*b* may detect second sensor signal 106 in a second time range 204. According to various specific embodiments, computer 108 may be configured to ascertain whether second sensor signal 106 is detected within a predefined time range 206 after the start of first time range 202. For example, computer 108 may be configured to ascertain whether second sensor signal 106 is detected in response to first sensor signal 104. As described above, first sensor signal 104 may be assigned to a user motion pattern and second sensor signal 106 may be assigned to a user input. As illustrated, computer 108 may ascertain whether the user input follows the user motion patterns (for example, whether the user input takes place in response to the user motion pattern).

Figure 1C:
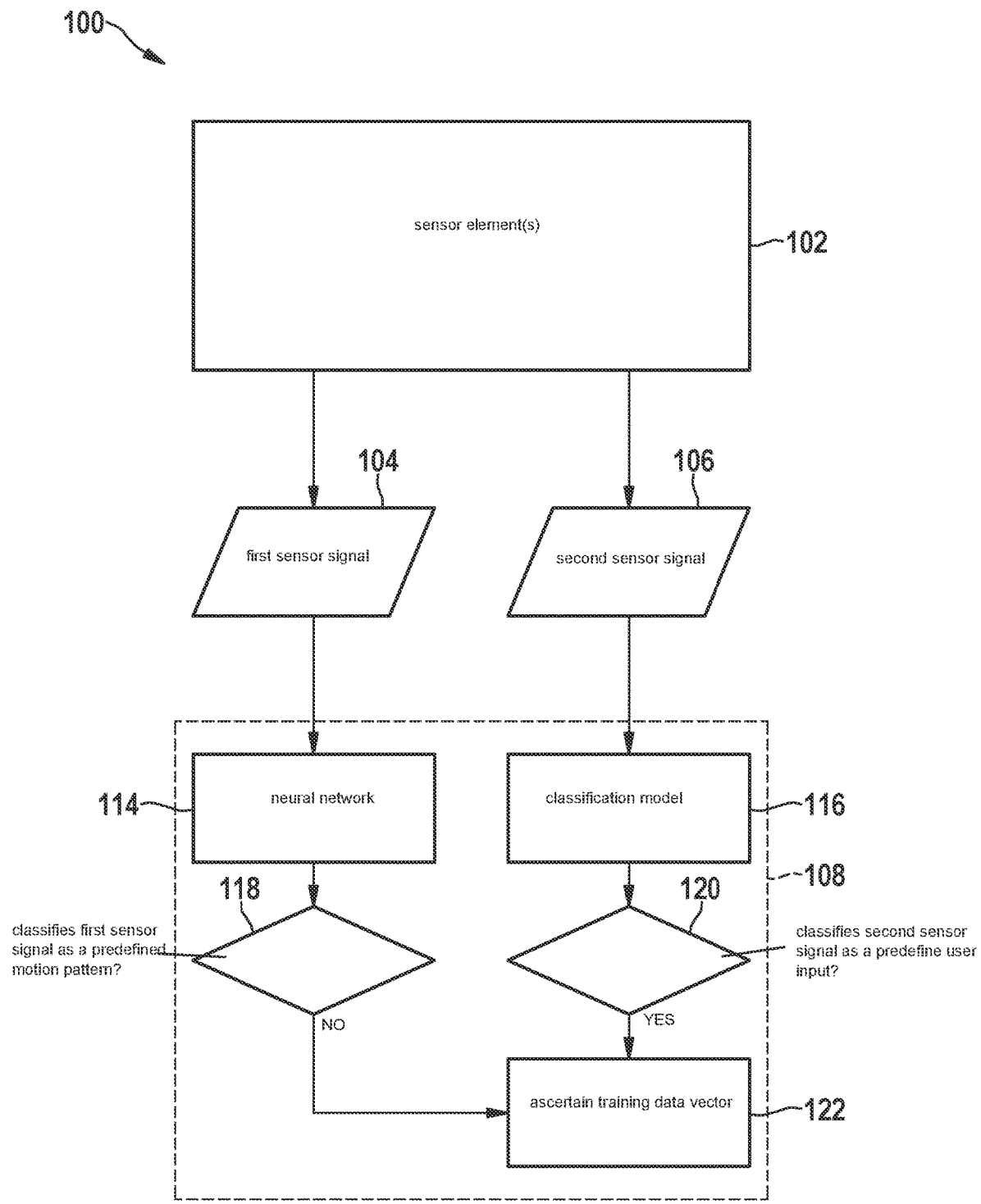

Referring to FIG. 1C, computer 108 may be configured to implement a pre-trained machine learning classifier. According to various specific embodiments, the machine learning classifier has been pre-trained in such a way that the pre-trained machine learning classifier classifies the sensor signal in response to an input of a sensor signal (for example, of first sensor signal 104). As described herein, the machine learning classifier may be any type of classifier, which is able to be adapted (for example, trained) with the aid of machine learning. According to various specific embodiments, an input of a sensor signal into the machine learning classifier may include a feature extraction for ascertaining features of the sensor signal and a processing of the ascertained features of the sensor signal with the aid of the machine learning classifier. For example, the machine learning classifier may be a decision tree, a random forest classifier, a gradient boosting classifier, a support vector machine, a k-nearest neighbor classifier, etc., and the input of the sensor signal into the machine learning classifier may include the feature extraction, and the machine learning classifier may carry out a classification using the ascertained features. The features of the sensor signal ascertained with the aid of the feature extraction may, for example, be output in a feature table. The features of the sensor signal ascertained with the aid of the feature extraction may include, for example, a mean value of the sensor signal, a minimum value of the sensor signal, a maximum value of the sensor signal, a squared mean of the sensor signal, an amplitude, a cross-correlation including test functions, etc. For example, the machine learning classifier may be a neural network and the sensor signal may be input directly (for example, without a prior feature extraction) into the neural network.

The exemplary embodiments are described below with reference to a neural network 114 as a machine learning classifier. It is noted, however, that the machine learning classifier as described in the previous paragraph may also include or may be another type of classifier, which may be trained with the aid of machine learning, and that the feature extraction may be carried out for various types of classifiers.

According to various specific embodiments, neural network 114 has been pre-trained with the aid of computer 108 in such a way that pre-trained neural network 114 classifies the sensor signal in response to an input of a sensor signal (for example, of first sensor signal 104). For example, pre-trained neural network 114 may classify a sensor signal as a user motion pattern or a sensor signal as no user motion pattern. For example, pre-trained neural network 114 may classify the sensor signal as one predefined user motion pattern of a plurality of predefined user motion patterns in response to the input of the sensor signal, or as no predefined user motion pattern of the plurality of predefined user motions patterns. According to various specific embodiments, the pre-trained neural network may be a classification network and may be configured to ascertain, in response to the input of the sensor signal, a probability for each class of a plurality of classes. Each class of the plurality of classes may be assigned to one predefined user motion pattern of the plurality of predefined user motion patterns. For example, computer 108 may be configured to ascertain a predefined user motion pattern if pre-trained neural network 114 ascertains a probability of the class of the plurality of classes assigned to the predefined user motion pattern is greater than a predefined probability threshold value. For example, computer 108 may ascertain that no predefined user motion pattern has been detected if pre-trained neural network 114 ascertains a probability for each class of the plurality of classes lower than the predefined probability threshold value.

According to various specific embodiments, neural network 114 may have been pre-trained for sensor signals (for example, a sensor signal of an acceleration sensor, of a rotation rate sensor, of a pressure sensor or of a magnetic field sensor), which describes a plurality of user motion patterns. For example, neural network 114 may have been trained for user motion patterns of a plurality of users. For example, a training data set may include a plurality of sensor signals. Each sensor signal of the plurality of sensor signals may be assigned to one user motion pattern of a plurality of user motion patterns. The training data set may include sensor signals labeled (for example, identified) with one user motion pattern (for example, each sensor signal of the plurality of sensor signals is assigned exactly one user motion pattern).

For example, each user motion pattern of the plurality of user motion patterns may be assigned a plurality of sensor signals. The sensor signals of the plurality of sensor signals may include the motion patterns of a plurality of users (for example, users of varying ages, for example, users of varying geographical origins, for example, users of varying genders, etc.).

As illustrated, a sensor signal may describe a motion pattern of a user and the training data set may include a plurality of sensor signals for each motion pattern of the plurality of motion patterns and the training data set may include for each motion pattern the sensor signals of a plurality of users. Neural network 114 may be pre-trained in such a way that, in response to an input of one sensor signal of the plurality of sensor signals, neural network 114 classifies the sensor signal as one user motion pattern of the plurality of user motion patterns or as no user motion pattern of the plurality of user motion patterns, that the user motion pattern ascertained with the aid of neural network 114 is compared with the user motion pattern assigned to the sensor signal and an error is ascertained, and that neural network 114 is trained using the error (for example, in order to reduce the error). This may be carried out for each sensor signal of the plurality of sensor signals of the training data set.

As described above, neural network 114 may be configured to ascertain a probability for each class of the plurality of classes. Each sensor signal of the plurality of sensor signals of the training data set may be assigned a class (for example, a class assigned to the user motion pattern). According to various specific embodiments, neural network 114 may be pre-trained in such a way that neural network 114, in response to an input of a sensor signal of the plurality of sensor signals, ascertains a probability for each class of the plurality of classes, that a lost value between the class assigned to the sensor signal and the probability ascertained for this class is ascertained with the aid of the loss function, and that neural network 114 is trained using the loss value in such a way that the loss value is reduced. This may be carried out for each sensor signal of the plurality of sensor signals of the training data set.

As described above, sensor 100 may include a plurality of first sensor elements, which are able to detect a plurality of first sensor signals. Neural network 114 described herein may be configured, in response to an input of the plurality of first sensor signals, to classify the plurality of first sensor signals as one predefined user motion pattern of the plurality of user motions patterns. For example, pre-trained neural network 114 may be configured to process sensor signals from an acceleration sensor, from a rotation rate sensor, from a pressure sensor and/or from a magnetic field sensor. The pre-training of neural network 114 may correspond essentially to the above described pre-training, each above-described sensor signal of the plurality of sensor signals of the training data set including multiple sensor signals.

Pre-trained neural network 114 may be configured, in response to an input of first sensor signal 104, to classify first sensor signal 104 as a predefined user motion pattern (for example, as a gesture) or to classify first sensor signal 104 as no predefined user motion pattern. Pre-trained neural network 114 may be configured, in response to an input of first sensor signal 104, to classify first sensor signal 104 as one predefined user motion pattern of a plurality of predefined user motion patterns or to classify first sensor signal 104 as no predefined user motion pattern of the plurality of predefined user motion patterns. Computer 108 may be configured to ascertain 118 whether pre-trained neural network 114, in response to the input of first sensor signal 104, classifies first sensor signal 104 as a predefined user motion pattern (for example, of the plurality of predefined user motion patterns).

Computer 108 may further be configured to implement a classification model 116. Classification model 116 may be configured to process second sensor signal 106. Classification model 116 may be configured to classify second sensor signal 106 as a predefined user input or as no predefined user input. A user input may include a user input for controlling a device (for example, the device that includes sensor 100, for example, a user input for carrying out a control action of the device). Classification model 116 may be configured to classify second sensor signal 106 as one predefined user input of a plurality of predefined user inputs or as no predefined user input of the plurality of predefined user inputs. Each predefined user input of the plurality of predefined user inputs may be assigned (for example, bijectively assigned) to one (for example, exactly one) predefined user motion pattern of the plurality of predefined user motion patterns. Computer 108 may be configured to ascertain 120 whether classification model 116, in response to an input of second sensor signal 106, classifies second sensor signal 106 as a predefined user input (for example, of the plurality of predefined user inputs).

According to various specific embodiments, computer 108 may be configured to ascertain a training data vector 122 for neural network 114 if second sensor signal 106 has been classified as the predefined user input and if first sensor signal 104 has not been classified as the user motion pattern assigned to the predefined user input. FIG. 2A shows an exemplary second sensor signal 106, which has been classified as the predefined user input and an exemplary first sensor signal 104, which has not been classified as the user motion pattern assigned to the predefined user input.

As described above, a training data set for training neural network 114 may include an assigned user motion pattern for each sensor signal. Training data vector 122 may include first sensor signal 104 and the user motion pattern assigned to the first sensor signal (for example, the user motion pattern assigned to the user input). According to various specific embodiments, pre-trained neural network 114 may be additionally (for example, user-specifically) trained using training data vector 122.

As illustrated, first sensor signal 104 may have been detected in response to a motion (for example, a gesture) of a user, neural network 114 recognizing the motion not as a predefined motion pattern. Second sensor signal 106 may be an input of the user in response to the motion of the user not recognized as a predefined motion pattern, in order, for example, to carry out a control action of the device assigned to the predefined motion pattern and to the user input. As illustrated, computer 108 may ascertain that the motion of the user should trigger the desired control action, and computer 108 may be configured to ascertain first sensor signal 104 and the user motion pattern assigned to the desired control action as training data vector 122. As illustrated, training data vector 122 represents a user-specific training data vector for the user-specific training of neural network 114.

Figure 1D:
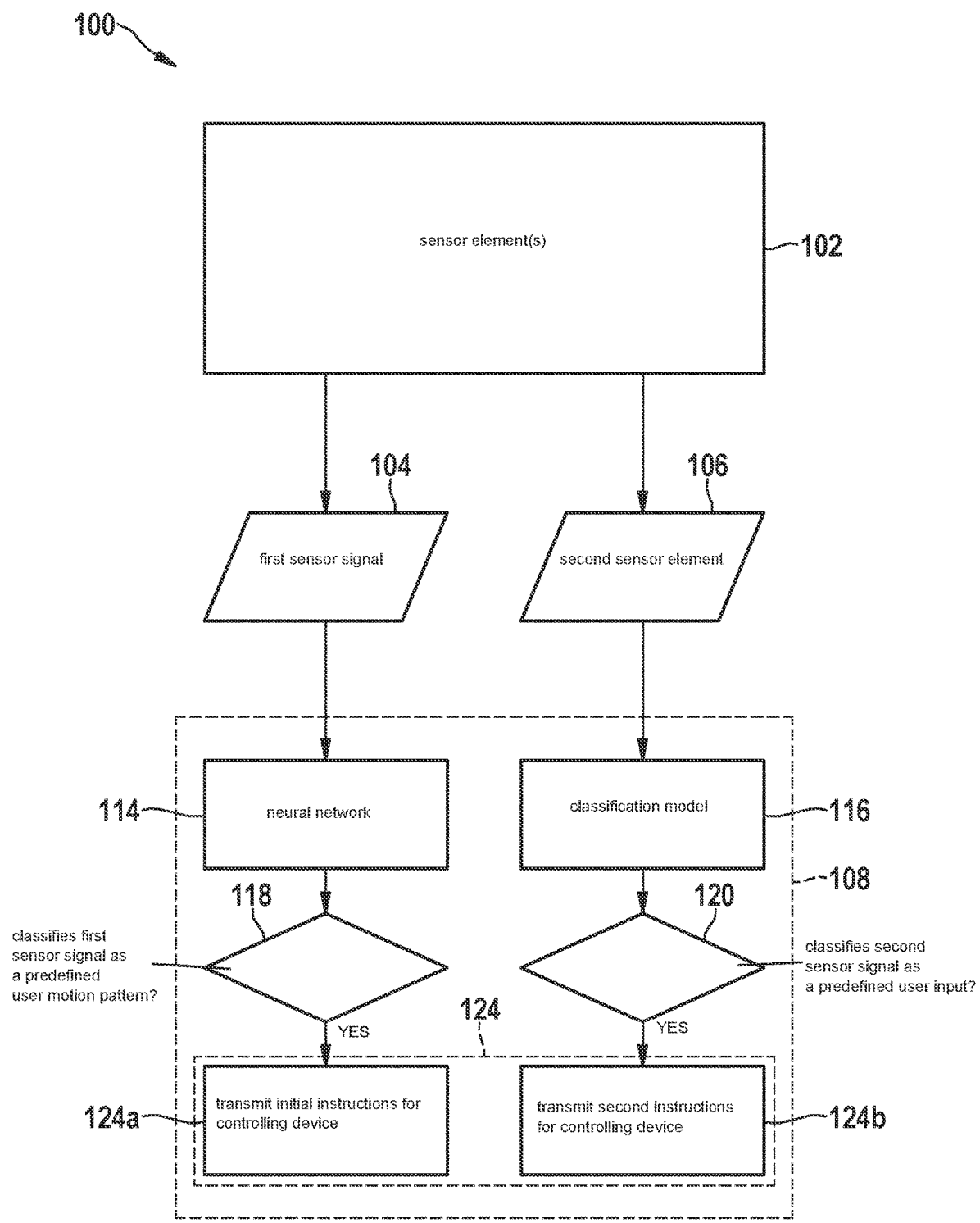

Referring to FIG. 1D, computer 108 may be configured to transmit instructions 124 for controlling a device to the device. Computer 108 may be configured to transmit initial instructions 124a for controlling the device to the device if first sensor signal 104 has been classified as a predefined user motion pattern (for example, of a plurality of predefined user motion patterns). Initial instructions 124a may be assigned to the user motion pattern. As illustrated, the user may intend a desired control action with the aid of the predefined user motion pattern and initial instructions 124a may be instructions for carrying out the desired control action. FIG. 2B shows a graph 200B including an exemplary sensor signal 104, which has been classified as a predefined user motion pattern.

Computer 108 may be configured to transmit second instructions 124b for controlling the device to the device if second sensor signal 106 has been classified as a predefined user input (for example, of a plurality of predefined user inputs). Second instructions 124b may be assigned to the user input. As illustrated, the user may intend a desired control action with the aid of the user input and second instructions 124b may be instructions for carrying out the desired control action.

According to various specific embodiments, a sliding window method as described above may be carried out, computer 108 being capable of ascertaining a plurality of sensor signals using the continuous signal detected with the aid of the one or multiple sensor elements 102. The time ranges of successive signals of the plurality of sensor signals may at least partially overlap. For example, computer 108 may ascertain a first plurality of sensor signals using the continuous signal detected with the aid of first sensor element 102a. For example, computer 108 may ascertain a second plurality of sensor signals using the continuous signal detected with the aid of second sensor element 102b. Computer 108 may be configured to ascertain for each sensor signal of the first plurality of sensor signals whether neural network 114, in response to an input of the respective sensor signal, classifies the sensor signal as a predefined user motion pattern. Computer 108 may be configured to ascertain for each sensor signal of the second plurality of sensor signals whether classification model 116, in response to an input of the respective sensor signal, classifies the sensor signal as a predefined user input.

According to various specific embodiments, computer 108 may be configured to ascertain a first number of sensor signals of the first plurality of sensor signals, which have been classified as a predefined user motion pattern (for example, the same user motion pattern of the plurality of user motion patterns) with the aid of neural network 114 within a predefined time range (for example, within approximately three seconds, for example within approximately five seconds, for example, within approximately 10 seconds). Computer 108 may be configured to transmit initial instructions 124a for controlling the device only once to the device if the first number for the predefined user motion pattern is greater than a first number threshold value (for example, greater than one). As illustrated, for the overlapping time ranges, multiple signals may be recognized as a motion of the user for controlling the device and computer 108 may transmit only one initial instruction 124a to the device so that, for example, the control action is not repeatedly carried out.

According to various specific embodiments, computer 108 may be configured to ascertain a second number of sensor signals of the second plurality of sensor signals, which have been classified as a predefined user input (for example, the same user input of the plurality of user inputs) with the aid of classification model 116 within a predefined time range (for example, within approximately three seconds, for example, within approximately five seconds, for example, within approximately ten seconds). Computer 108 may be configured to transmit second instructions 124*b* for controlling the device only once to the device if the second number for the predefined user input is greater than a second number threshold value (for example, greater than one). As illustrated, for the overlapping time ranges, multiple signals may be recognized as an input of the user for controlling the device and computer 108 may transmit only one second instruction 124*b* to the device so that, for example, the control action is not repeatedly carried out.

According to various specific embodiments, computer 108 may be configured to ascertain a sum of the first number and of the second number within the same predefined time range. Computer 108 may be configured to transmit only one instruction 120 for controlling the device to the device if the sum of the first number and of the second number is greater than a third number threshold value (for example, greater than one). As illustrated, a multiple activation of a control action may be prevented in this way.

For example, a time stamp may be assigned to each sensor signal of the plurality of sensor signals and computer 108 may be configured to ascertain the respective number of sensor signals within a predefined time range using the assigned time stamp.

Similarly, computer 108 may be configured to ascertain a number of training data vectors, which have been ascertained as for a predefined user motion pattern (for example, the same user motion pattern of the plurality of user motion patterns) within a predefined time range (for example, within approximately three seconds, for example, within approximately five seconds, for example, within approximately ten seconds). Computer 108 may be configured to store the training data vector only once (for example, in second memory device 140 in the case of a false-negative training data vector, for example, in third memory device 142 in the case of a false-positive training data vector, see FIG. 1I), if multiple training data vectors have been ascertained within the predefined time range for the same user motion pattern of the plurality of user motion patterns. According to various specific embodiments, the predefined time range may be approximately 1 day and computer 108 may ascertain a malfunction if the ascertained number of training data vectors within the day is greater than a predefined error threshold value (for example, greater than 100).

Figure 1E:
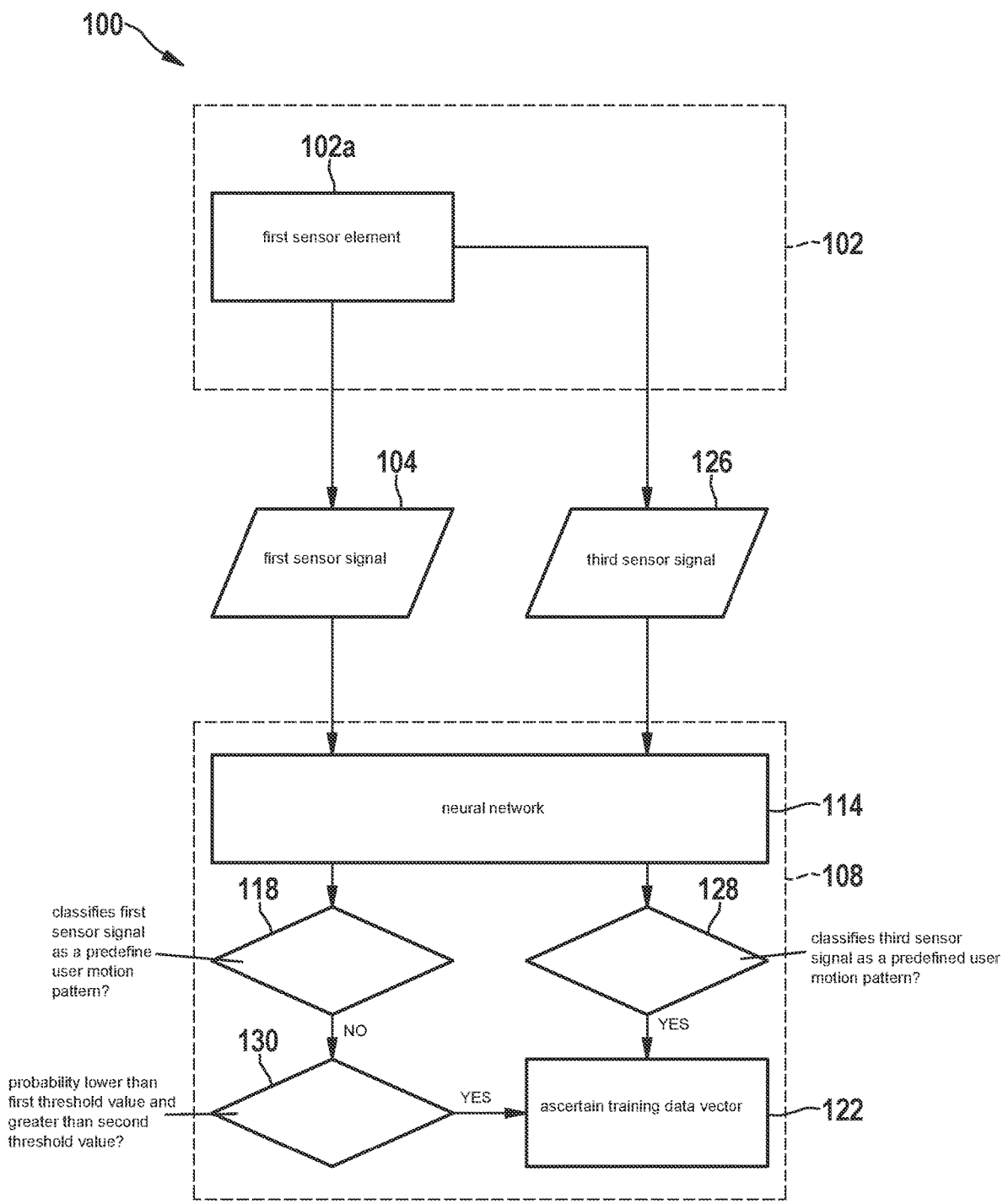

Referring to FIG. 1E, the one or multiple sensor elements 102 may be configured to detect a third sensor signal 126. For example, first sensor element 102*a* may further be configured to detect third sensor signal 126. Third sensor signal 126 may be assigned to a user motion pattern (for example, to a gesture).

According to various specific embodiments, pre-trained neural network 114 may be configured to process third sensor signal 126. Pre-trained neural network 114 may be configured, in response to an input of third sensor signal 126, to classify third sensor signal 126 as a predefined user motion pattern or to classify third sensor signal 126 as no predefined user motion pattern. Pre-trained neural network 114 may be configured, in response to an input of third sensor signal 126, to classify third sensor signal 126 as one predefined user motion pattern of a plurality of user motion patterns or to classify third sensor signal 126 as no predefined user motion pattern of the plurality of user motion patterns. Computer 108 may be configured to ascertain 128 whether pre-trained neural network 114, in response to the input of third sensor signal 126, classifies third sensor signal 126 as a predefined user motion pattern (for example, of the plurality of predefined user motion patterns).

According to various specific embodiments, pre-trained neural network 114 as described above may be configured, in response to an input of a sensor signal, to ascertain a probability of every predefined user motion pattern of the plurality of predefined user motion patterns. For example, pre-trained neural network 114 may be configured, in response to an input of the sensor signal, to ascertain a probability of every first class of a plurality of first classes. Each first class of the plurality of first classes may be assigned (for example, bijectively assigned) to one predefined user motion pattern of the plurality of predefined user motion patterns. Computer 108 may be configured to ascertain first sensor signal 104 as one predefined user motion pattern of the plurality of user motion patterns if pre-trained neural network 114 ascertains a probability of the predefined user motion pattern greater than a predefined first probability threshold value. Computer 108 may be configured to ascertain 118 whether pre-trained neural network 114, in response to an input of first sensor signal 104, one probability of a predefined user motion pattern of the plurality of predefined user motion patterns ascertained with the aid of neural network 114 is greater than the predefined first probability threshold value. The predefined first probability threshold value may, for example, include a probability value selected from a range of approximately 0.5 to approximately 1 (for example, a probability value of 0.9, for example a probability value of 0.8, for example, a probability value of 0.7, for example, a probability value of 0.6).

Computer 108 may be configured to ascertain 130 whether pre-trained neural network 114, in response to an input of first sensor signal 104, a probability of one predefined user motion pattern of the plurality of user motion patterns, ascertained with the aid of neural network 114, is lower than the predefined first probability threshold value and is greater than a predefined second probability threshold value. The predefined second probability threshold value may be lower than the predefined first probability threshold value. The predefined second threshold value may, for example, include a probability value selected from a range of approximately 0.25 to approximately 0.8 (for example, a probability value of 0.8, for example, a probability value of 0.7, for example, a probability value of 0.6, for example, a probability value of 0.5, for example, a probability value of 0.3).

Computer 108 may be configured to ascertain training data vector 122 if, in response to the input of third sensor signal 126 into neural network 114, a probability ascertained for one user motion pattern of the plurality of user motion patterns is greater than the predefined first probability threshold value, and if, in response to the input of first sensor signal 104 into neural network 114, a probability ascertained for the user motion pattern is lower than the predefined first probability threshold value and greater than the predefined second probability threshold value. FIG. 2C shows a graph 200C including an exemplary first sensor signal 104, for which a probability of a user motion pattern lower than the first probability threshold value and greater than the second probability threshold value has been ascertained, and an exemplary third sensor signal 126, for which a probability of the user motion pattern greater than the first probability threshold value has been ascertained. Third sensor signal 126 may be detected in a third time range 214. First time range 202 may start before third time range 214. For example, a start of third sensor signal 126 may be after a start of first sensor signal 104. According to various specific embodiments, third sensor signal 126 may be detected after first sensor signal 104 (for example, detected within predefined time range 206).

As illustrated, first sensor signal 104 may have been detected in response to a first motion (for example, a gesture) of a user, neural network 114 recognizing the first motion not as a predefined motion pattern, since a probability for the predefined motion pattern ascertained with the aid of neural network 114 is lower than the predefined first probability threshold value. Third sensor signal 126 may also have been detected in response to a second motion of the user, neural network 114 recognizing the second motion as the predefined motion pattern, since a probability for the predefined motion pattern ascertained with the aid of neural network 114 is greater than the predefined first probability threshold value. For example, the second motion may occur in response to the first motion not recognized as a predefined motion pattern since, for example, a control action of the device assigned to the motion pattern of the first motion has not been carried out. As illustrated, computer 108 may ascertain that the first motion of the user should trigger the desired control action if the probability ascertained for first sensor signal 104 is greater than the second probability threshold value, and computer 108 may be configured to ascertain first sensor signal 104 and the assigned user motion pattern as training data vector 122.

Figure 1F:
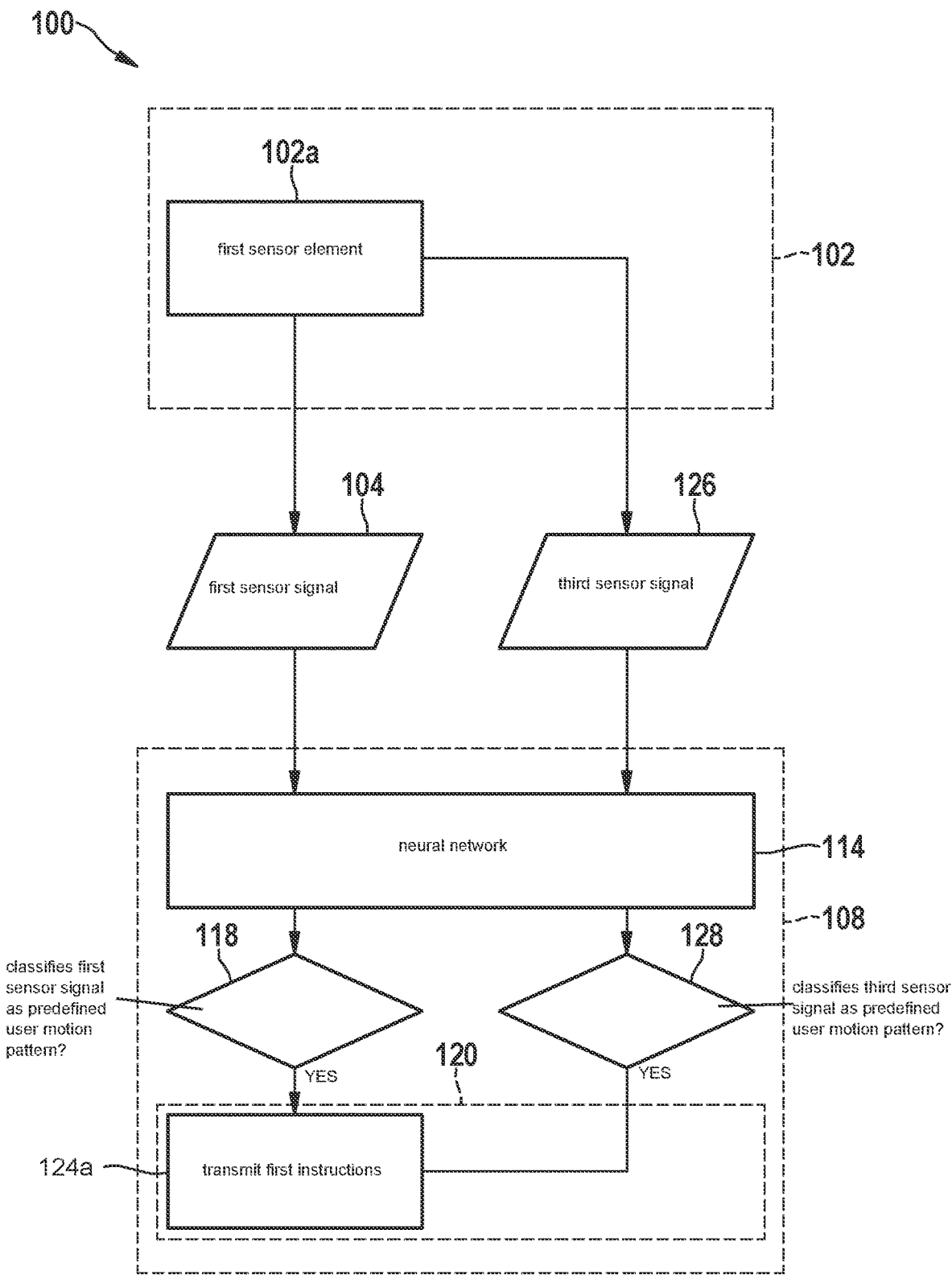

As shown in FIG. 1F, computer 108 may be configured to transmit first instructions 124a assigned to the user motion pattern to the device if, in response to the input of third sensor signal 126 into neural network 114, neural network 114 ascertains a probability of a user motion pattern greater than the first probability threshold value.

Figure 1G:
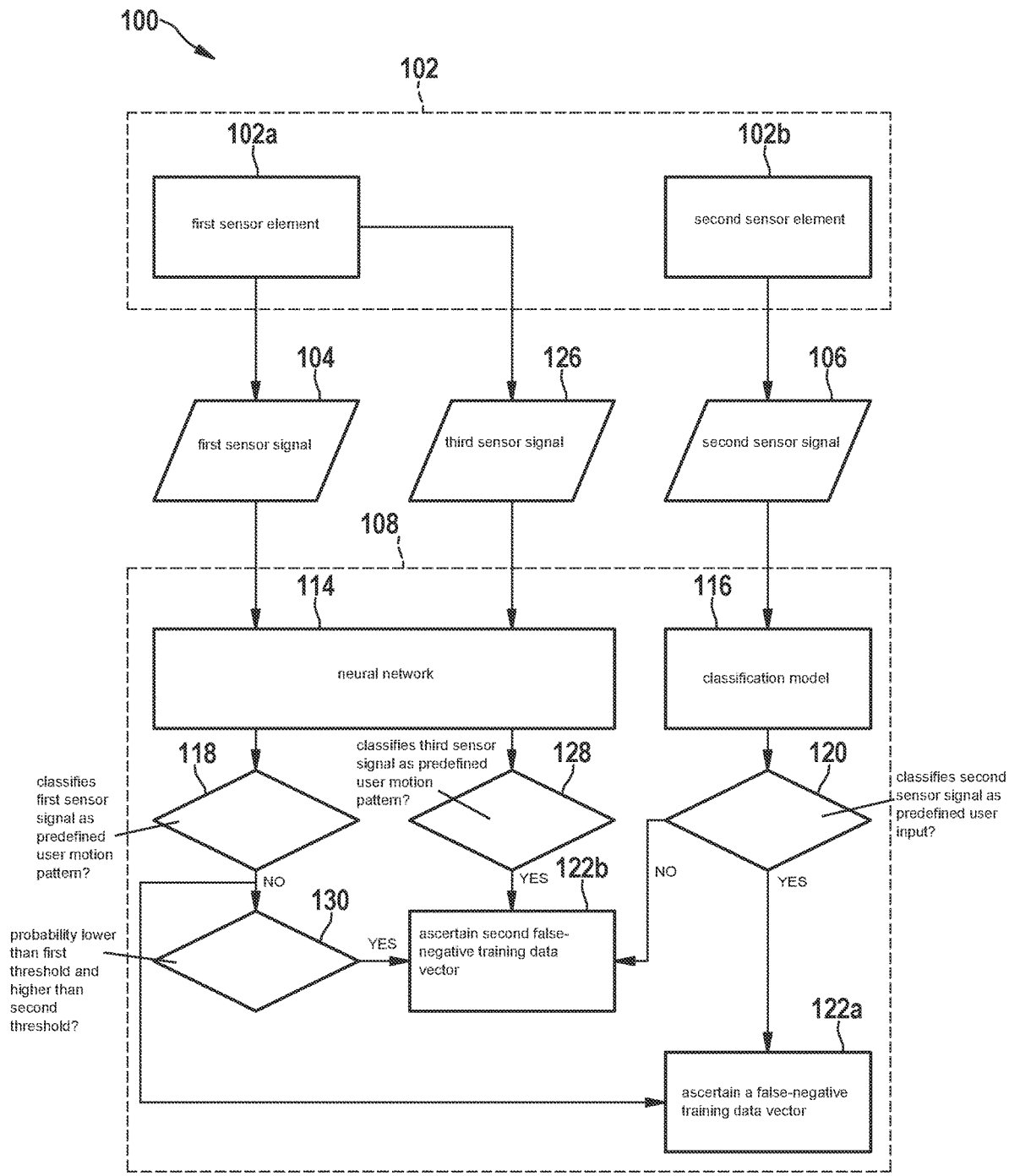

Training data vector 122 may be a false-negative training data vector. Referring to FIG. 1G, computer 108 may be configured to ascertain a false-negative training data vector 122a if neural network 114 ascertains for first sensor signal 104 a probability (for example, a probability value) of one user motion pattern of the plurality of user motion patterns, which is lower than the predefined first probability threshold value ("No" in 118), and if classification model 116, in response to the input of second sensor signal 106, ascertains second sensor signal 106 not as the user input assigned to the user motion pattern ("No" in 120). First false-negative training data vector 122a may include first sensor signal 104 and the assigned user motion pattern. Computer 108 may be configured to ascertain a second false-negative training data vector 122b if neural network 114 ascertains for first sensor signal 104 a probability (for example, a probability value) of one user motion pattern of the plurality of user motion patterns, which is lower than the predefined first probability threshold value ("No" in 118) and which is greater than the predefined second probability threshold value ("Yes" in 130), if neural network 114 ascertains for third sensor signal 126 a probability (for example, a probability value) of the user motion pattern, which is greater than the predefined first probability threshold value ("Yes" in 128), and if classification model 116, in response to the input of second sensor signal 106, ascertains second sensor signal 106 not as the user input assigned to the user motion pattern ("No" in 120). Second false-negative training data vector 122b may include first sensor signal 104 and the assigned user motion pattern.

Figure 1H:
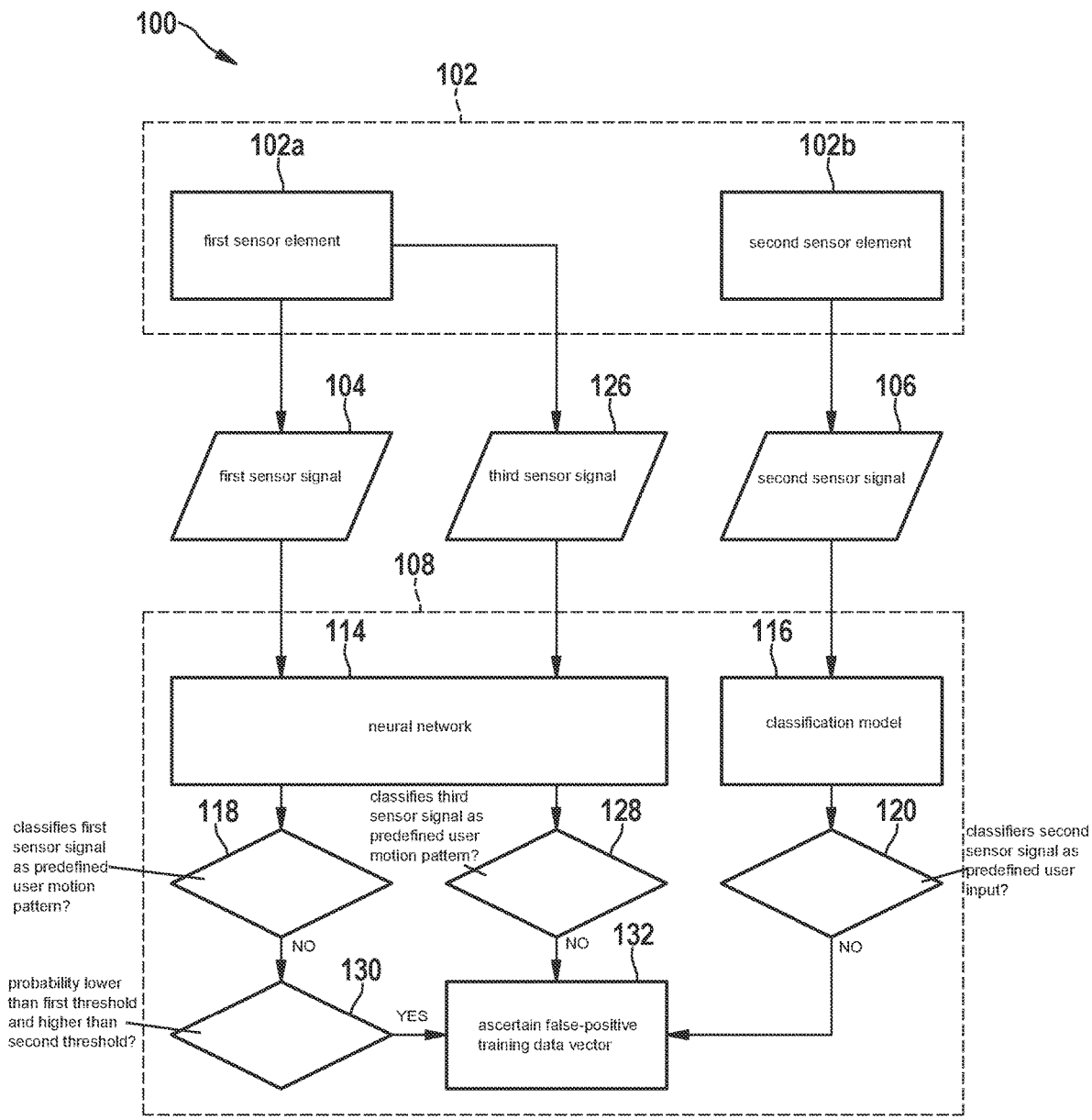

Referring to FIG. 1H, computer 108 may be configured to ascertain a false-positive training data vector 132. Computer 108 may be configured to ascertain a false-positive training data vector 132 if neural network 114 ascertains for first sensor signal 104 a probability (for example, a probability value) of one user motion pattern of the plurality of user motion patterns, which is lower than the predefined first probability threshold value ("No" in 118) and which is greater than the predefined second probability threshold value ("Yes" in 130) if neural network 114 ascertains for third sensor signal 126 a probability (for example, a probability value) of the user motion pattern, which is lower than the predefined first probability threshold value ("No" in 128) and if classification model 116, in response to the input of second sensor signal 106, ascertains second sensor signal 106 not as the user input assigned to the user motion pattern ("No" in 120). False-positive training data vector 132 may include first sensor signal 104 and the assigned user motion pattern. FIG. 2D shows a graph 200D including an exemplary first sensor signal 104, for which a probability of a user motion pattern lower than the first probability threshold value and greater than the second probability threshold value has been ascertained, and neither a second sensor signal 106, which has been classified as a user input assigned to the user motion pattern, nor a third sensor signal 126, which has been classified as the user motion patterns having been detected within predefined time range 206 after first time range 202 of first sensor signal 104.

As illustrated, first sensor signal 104 may have been detected in response to a motion (for example, a gesture) of a user, neural network 114 recognizing the motion not as a predefined user motion pattern, but still ascertaining a probability for a predefined user motion pattern greater than the predefined second probability threshold value. For example, the one or multiple sensor elements 102 may ascertain a sensor signal above a respectively assigned signal threshold value within a predefined time range after detection of first sensor signal 104 (for example, with predefined time range 206 after the start of first time range 202 assigned to first sensor signal 104). For example, the one or multiple sensor elements 102 may detect second sensor signal 106 and third sensor signal 126 within the predefined time range. As illustrated, the user intended to carry out no motion for carrying out a control action and therefore neither carries out an additional motion nor does the user carry out a user input, so that computer 108 ascertains that the motion assigned to first sensor signal 104 represents no desired motion pattern of the user (for example, is a false-positive signal).

Figure 1I:
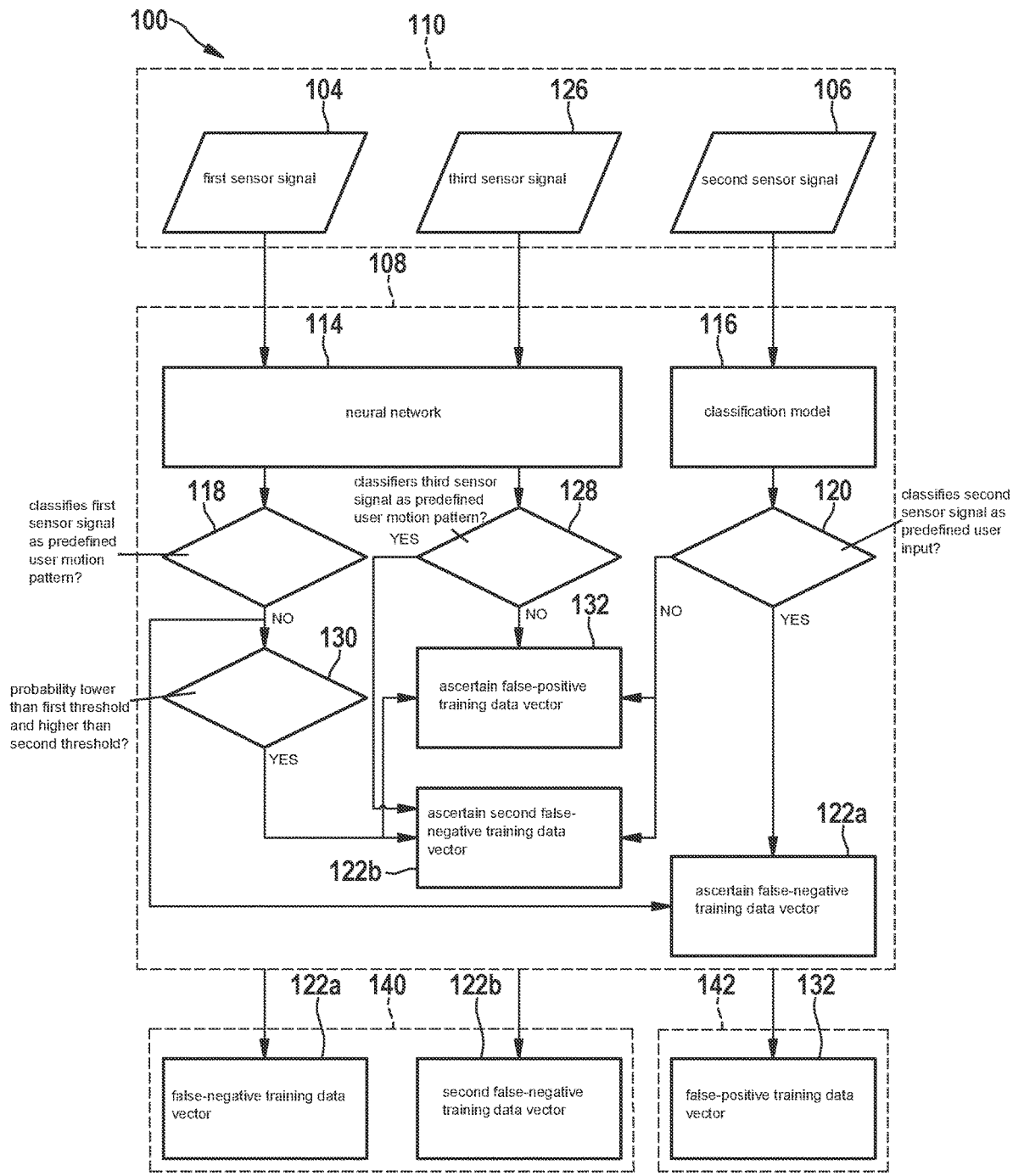
Figure 1J:
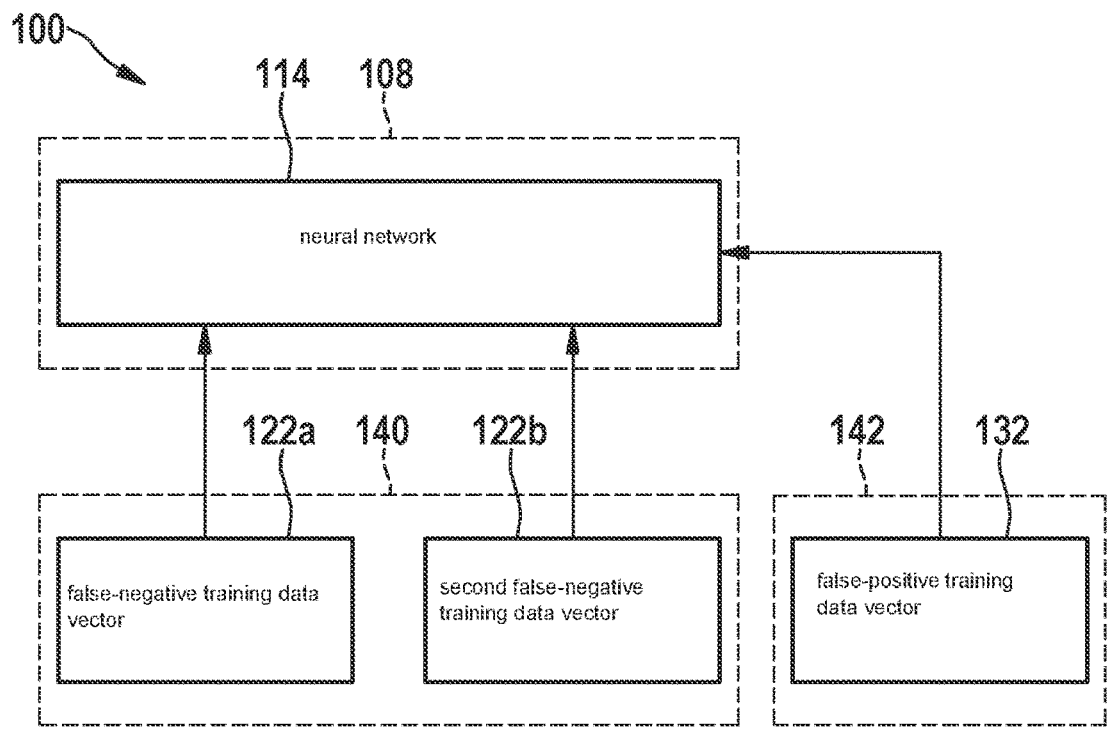

Referring to FIG. 1I, sensor 100 may include a second memory device 140. Second memory device 140 may, for example, be a first FIFO memory ("First In First Out" memory). Second memory device 140 may be configured to store false-negative training data vectors (for example, first false-negative training data vector 122a, for example, second false-negative training data vector 122b). Sensor 100 may include a third memory device 142. Third memory device 142 may, for example, be a second FIFO memory. Third memory device 142 may be configured to store false-positive training data vectors (for example, false-positive training data vector 132). Computer 108 may be configured to provide first false-negative training data vector 122a and/or second false-negative training data vector 122b to second memory device 140. Computer 108 may be configured to provide false-positive training data vector 132 to third memory device 142.

According to various specific embodiments, computer 108 may be configured to copy first sensor signal 104 assigned to the false-negative training data vector from first memory device 110 (for example, from the ring memory) into second memory device 140 (for example, into the first FIFO memory) if a false-negative training data vector has been ascertained (for example, to copy the instantaneous list position of the first FIFO memory and to subsequently increment the index indicator of the first FIFO memory). According to various specific embodiments, computer 108 may be configured to copy first sensor signal 104 assigned to the false-positive training data vector from first memory device 110 into third memory device 142 (for example, the second FIFO memory) if a false-positive training data vector has been ascertained (for example, to copy to the instantaneous list position of the second FIFO memory and to subsequently increment the index indicator of the second FIFO memory).

Referring to FIGS. 1J through 1M, computer 108 may be configured to additionally train pre-trained neural network 114 using ascertained training data vectors (for example, first false-negative training data vector 122a, for example, second false-negative training data vector 122b, for example, false-positive training data vector 132). The additional training of neural network 114 may correspond essentially to the pre-training of neural network 114 described herein, the training data set including the ascertained training data vectors. For example, pre-trained neural network 114, in response to an input of an ascertained training data vector, may ascertain a probability of every predefined user motion pattern of the plurality of user motion patterns. Computer 108 may be configured to ascertain a loss value with the aid of a loss function (for example, a maximum likelihood loss function, for example, a cross-entropy loss function, for example, a mean squared error, etc.) using the user motion pattern assigned to the respective training data vector and the probability for this user motion pattern ascertained with the aid of neural network 114. Pre-trained neural network 114 may additionally be trained in such a way that the loss value is reduced (for example, minimized).

For example, in the case that the training data vector is a false-negative training data vector (for example, first false-negative training data vector 122a, for example, second false-negative training data vector 122b), the loss function may ascertain an ever greater loss value, the greater the deviation of the ascertained probability of the assigned user motion pattern is from "1". As illustrated, first sensor signal 104 of a false-negative training data vector represents a motion pattern carried out by the user for carrying out a desired control action, neural network 114 having classified first sensor signal 104 not as the user motion pattern, as described above. As illustrated, the additional training may result in an increase in the probability for the user motion pattern assigned first sensor signal 104 of the false-negative training data vector ascertained with the aid of neural network 114, so that additionally trained neural network 114 is able to recognize the user-specific behavior as the desired control action.

For example, in the case that the training data vector is a false-positive training data vector (for example, false-positive training data vector 132), the loss function may ascertain an even greater loss value the greater the deviation of the ascertained probability of the assigned user motion pattern is from "0". As illustrated, first sensor signal 104 of a false-positive training data vector represents a motion pattern carried out by the user, which is intended to carry out no control action, neural network 114 having ascertained for first sensor signal 104 a probability of a user motion pattern greater than the second probability threshold value, as described above. As illustrated, the additional training may result in a drop in the probability for the user motion pattern assigned to first signal sensor 104 of the false-positive training data vector ascertained with the aid of neural network 114, so that additionally trained neural network 114 is able to classify user-specific behavior, which is intended to carry out no control action, not as a user motion pattern for carrying out a control action. This results in additionally trained neural network 114 not carrying out any control actions not desired by the user.

Figure 1K:
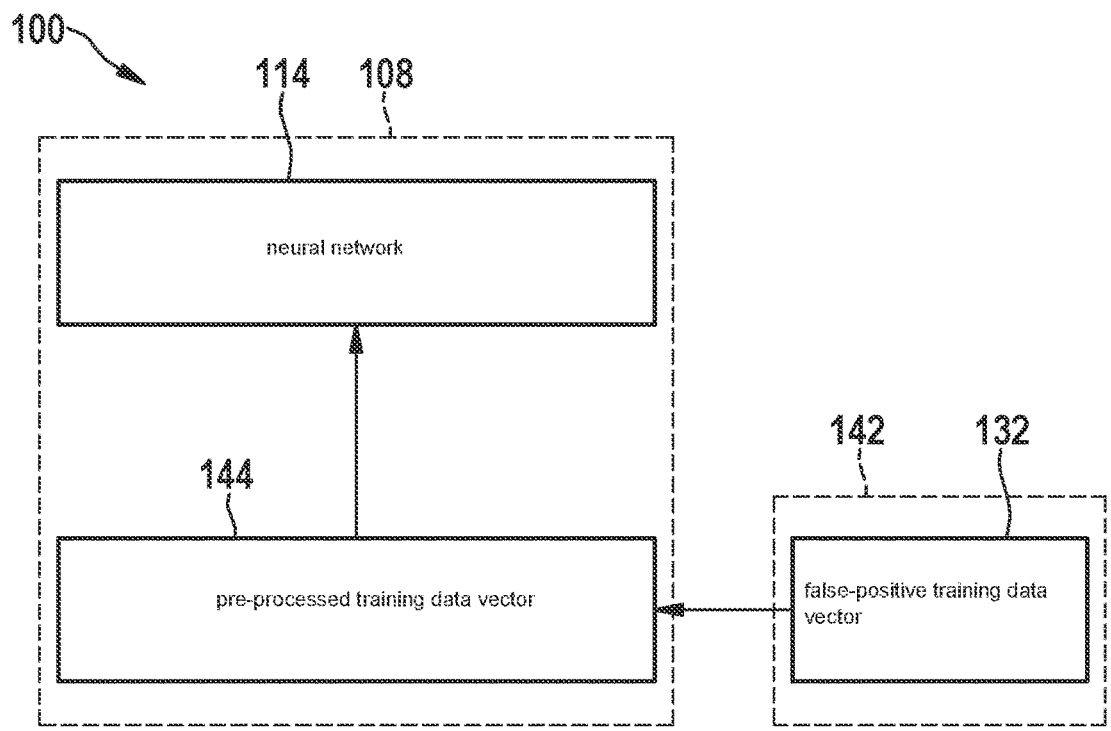
Figure 2E:
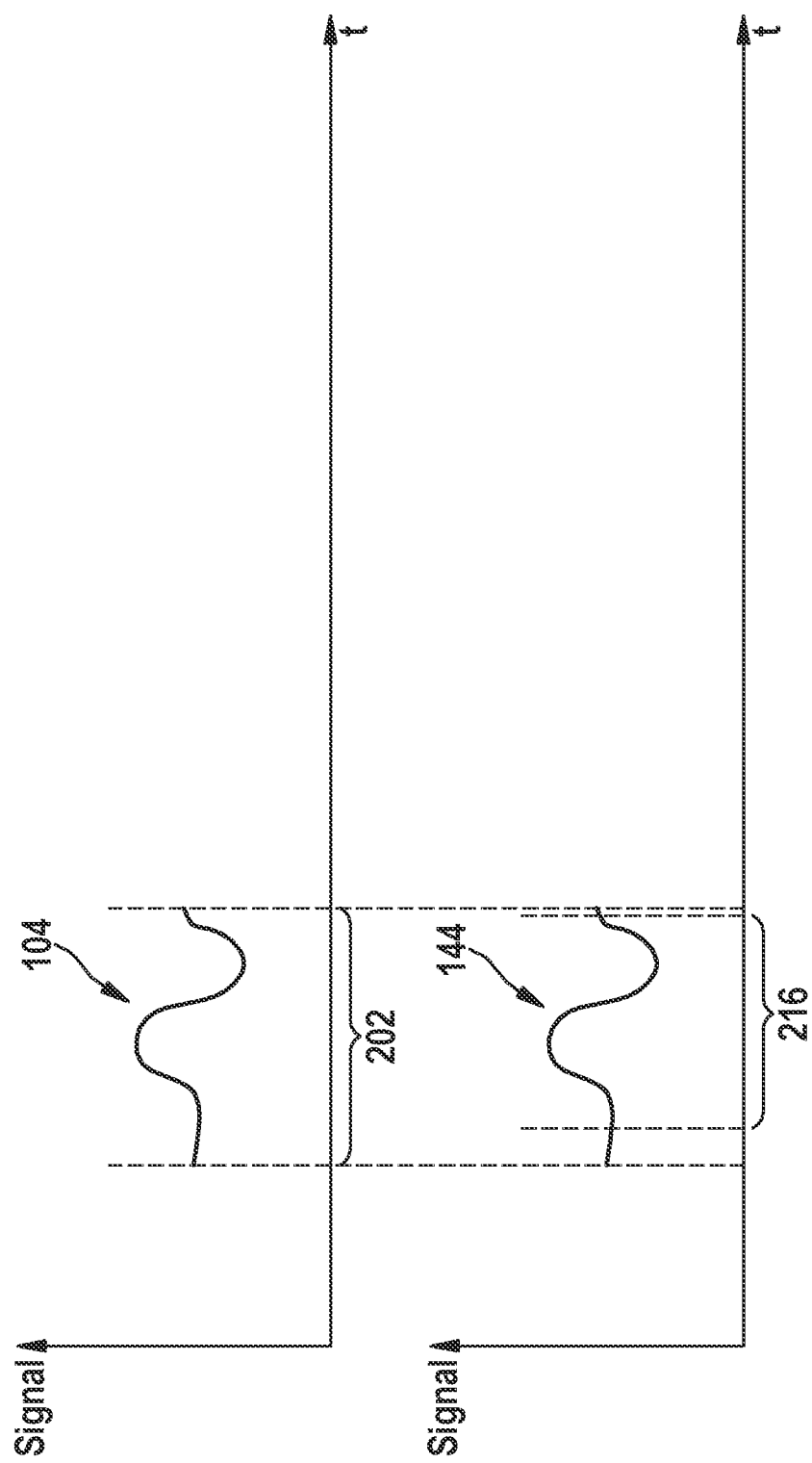

According to various specific embodiments, computer 108 may be further configured to pre-process a respective training data vector and to train pre-trained neural network 114 using the pre-processed training data vector. FIG. 1K shows by way of example the ascertainment of a pre-processed training data vector 144 for false-positive training data vector 132. FIG. 2E shows an exemplary first sensor signal 104 of false-positive training data vector 132, which has been detected in first time range 202. Computer 108 may be configured to pre-process first sensor signal 104 in such a way that first time range 202 is reduced to a third time range 216, which is shorter than first time range 202. As illustrated, a portion of first sensor signal 104, which has a lower signal strength, for example, is cut off. This has the effect, for example, of reducing the memory requirement for the training data vector. The computing effort during additional training of neural network 114 may further be reduced as a result.

Figure 1L:
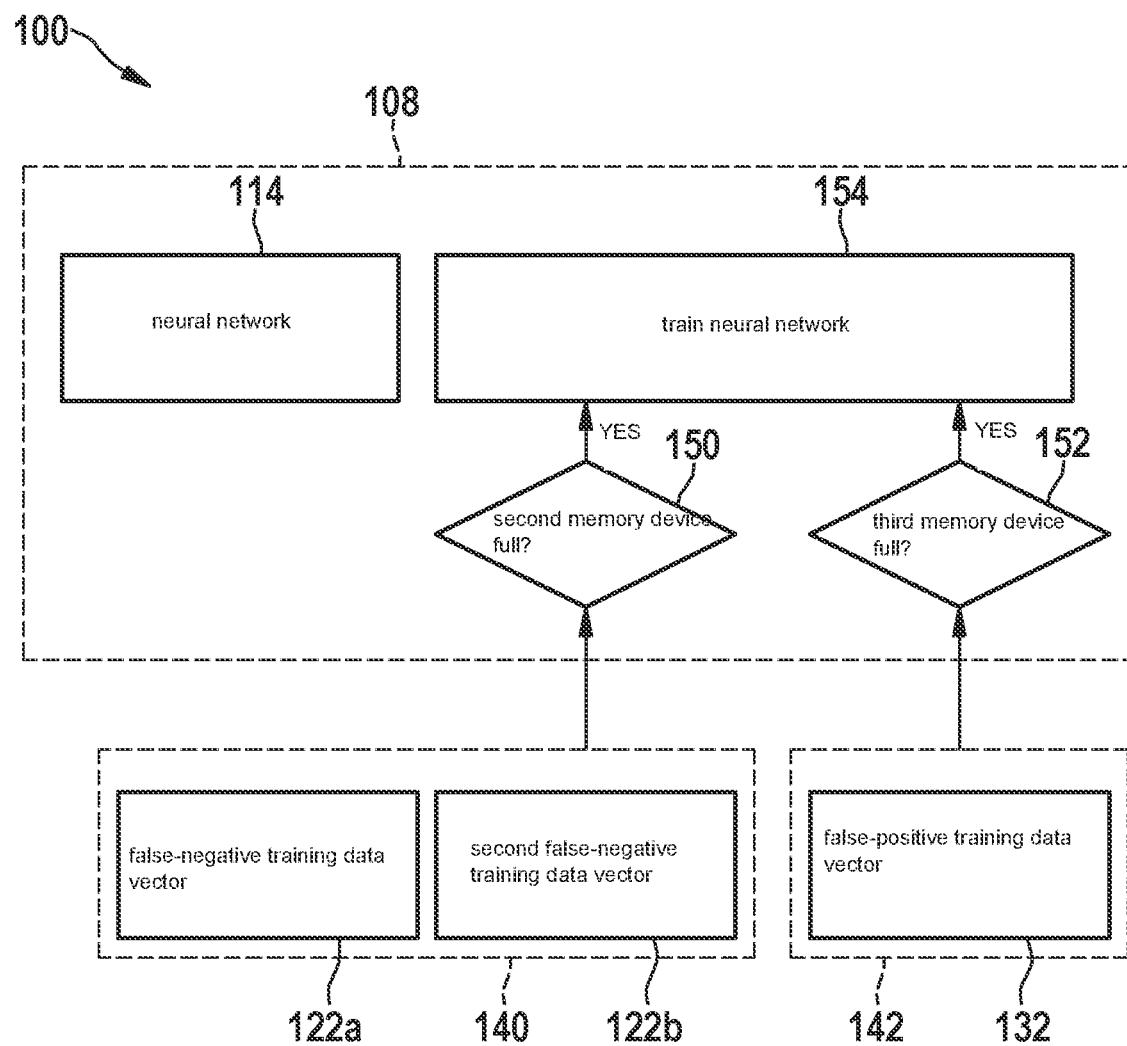
Figure 1M:
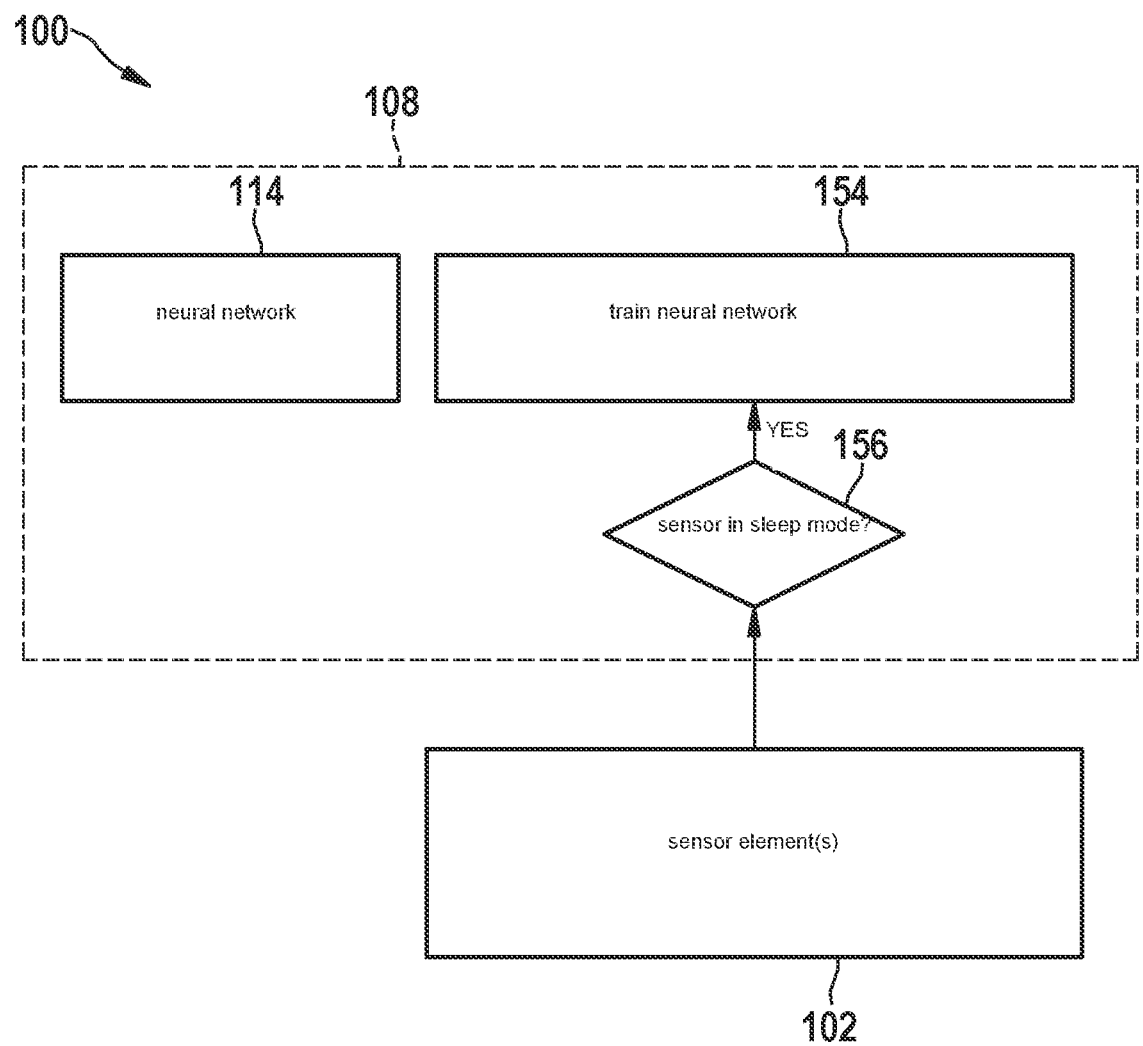

According to various specific embodiments, the one or multiple sensor elements 102 may detect a plurality of first sensor signals, a plurality of second sensor signals and a plurality of third sensor signals. Sensor 100 may be configured to ascertain multiple false-negative training data vectors and multiple false-positive training data vectors using the plurality of first sensor signals, the plurality of second sensor signals and the plurality of third sensor signals (for example, under the conditions described herein). Second memory device 140 may be configured to store each false-negative training data vector of the multiple false-negative training data vectors. Third memory device 142 may be configured to store each false-positive training data vector of the multiple false-positive training data vectors. Referring to FIG. 1L, computer 108 may be configured to ascertain 150 whether the memory (for example, the first FIFO memory) of second memory device 140 is full. For example, computer 108 may be configured to ascertain 150 whether more than one predefined number (for example, more than ten, for example, more than fifteen, for example, more than twenty) of training data vectors are stored in second memory device 140. Computer 108 may be configured to ascertain that second memory device 140 is full if more than the defined number of training data vectors are stored in second memory device 140 ("Yes" in 150). Computer 108 may be configured to train 154 neural network 114 using the multiple false-negative training data vectors, if computer 108 ascertains that the memory of second memory device 140 is full. Computer 108 may be configured to ascertain 152 whether the memory (for example, the second FIFO memory) of third memory device 142 is full. For example, computer 108 may be configured to ascertain 152 whether more than a defined number (for example, more than ten, for example, more than fifteen, for example, more than twenty) of training data vectors are stored in third memory device 142. Computer 108 may be configured to ascertain that third memory device 142 is full if more than the predefined number of training data vectors are stored in third memory device 142 ("Yes" in 152). Computer 108 may be configured to additionally train 154 neural network 114 using the multiple false-positive training data vectors if computer 108 ascertains that the memory of third memory device 142 is full.

According to various specific embodiments, computer 108 may be configured to ascertain whether a signal having a signal strength greater than the predefined signal threshold value has been ascertained with the aid of the one or multiple sensor elements 102. Computer 108 may be configured to additionally train pre-trained neural network 114 using the multiple false-negative training data vectors and/or multiple false-positive training data vectors, if computer 108 ascertains that no signal having a signal strength greater than the predefined signal threshold value has been ascertained. For example, computer 108 may ascertain whether no signal having a signal strength greater than the predefined signal threshold value has been ascertained within a predefined time range. Computer 108 may be configured to ascertain 156 that sensor 100 is in a sleep mode if no signal having a signal strength greater than the predefined signal threshold value has been ascertained within the predefined time range. According to various specific embodiments, computer 108 may be configured to additionally train 154 neural network 114 if sensor 100 is in the sleep mode.

Figure 3A:
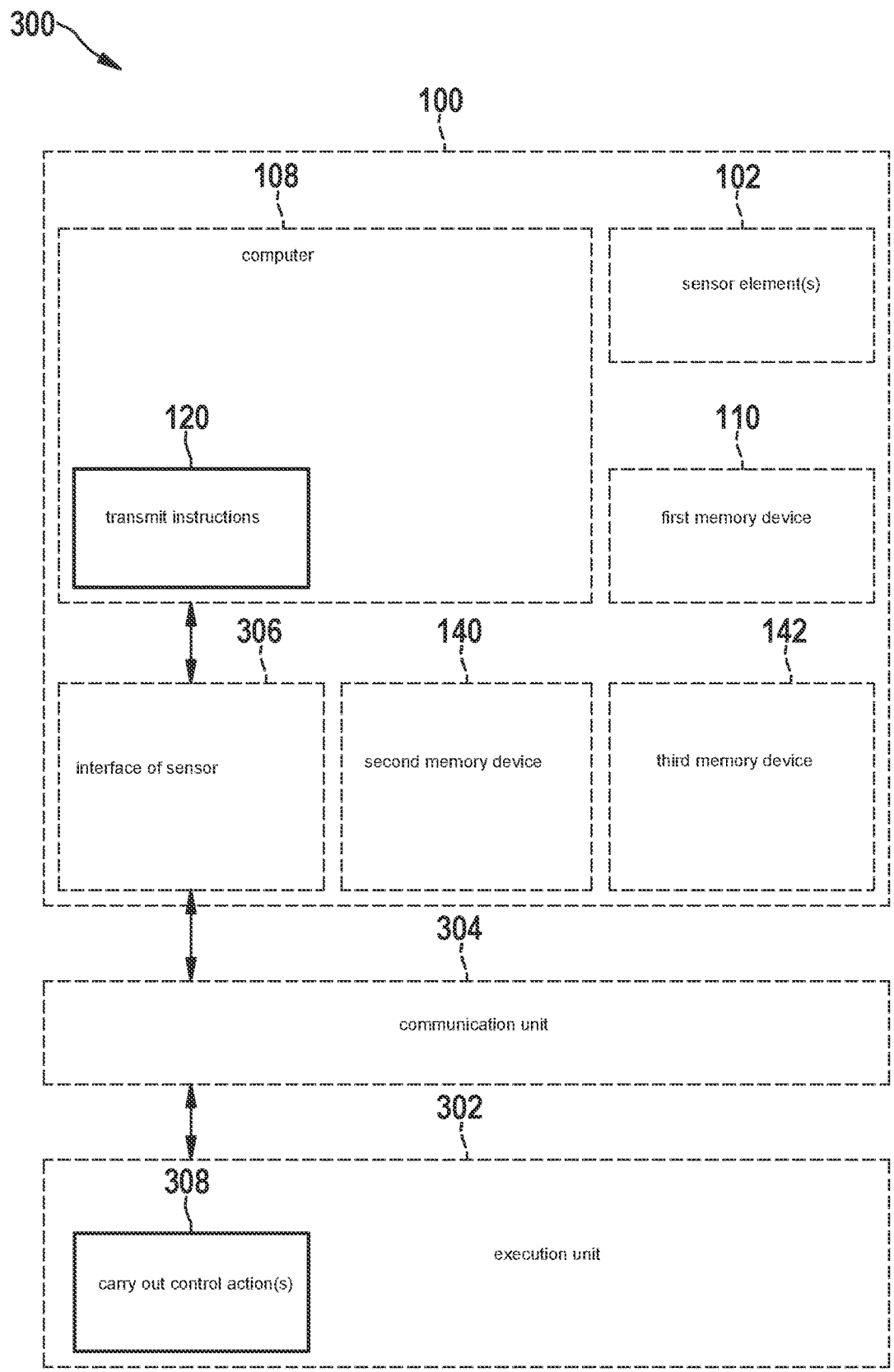
FIGS. 3A and 3B show a system including a sensor according to various specific embodiments of the present invention.
Figure 3B:
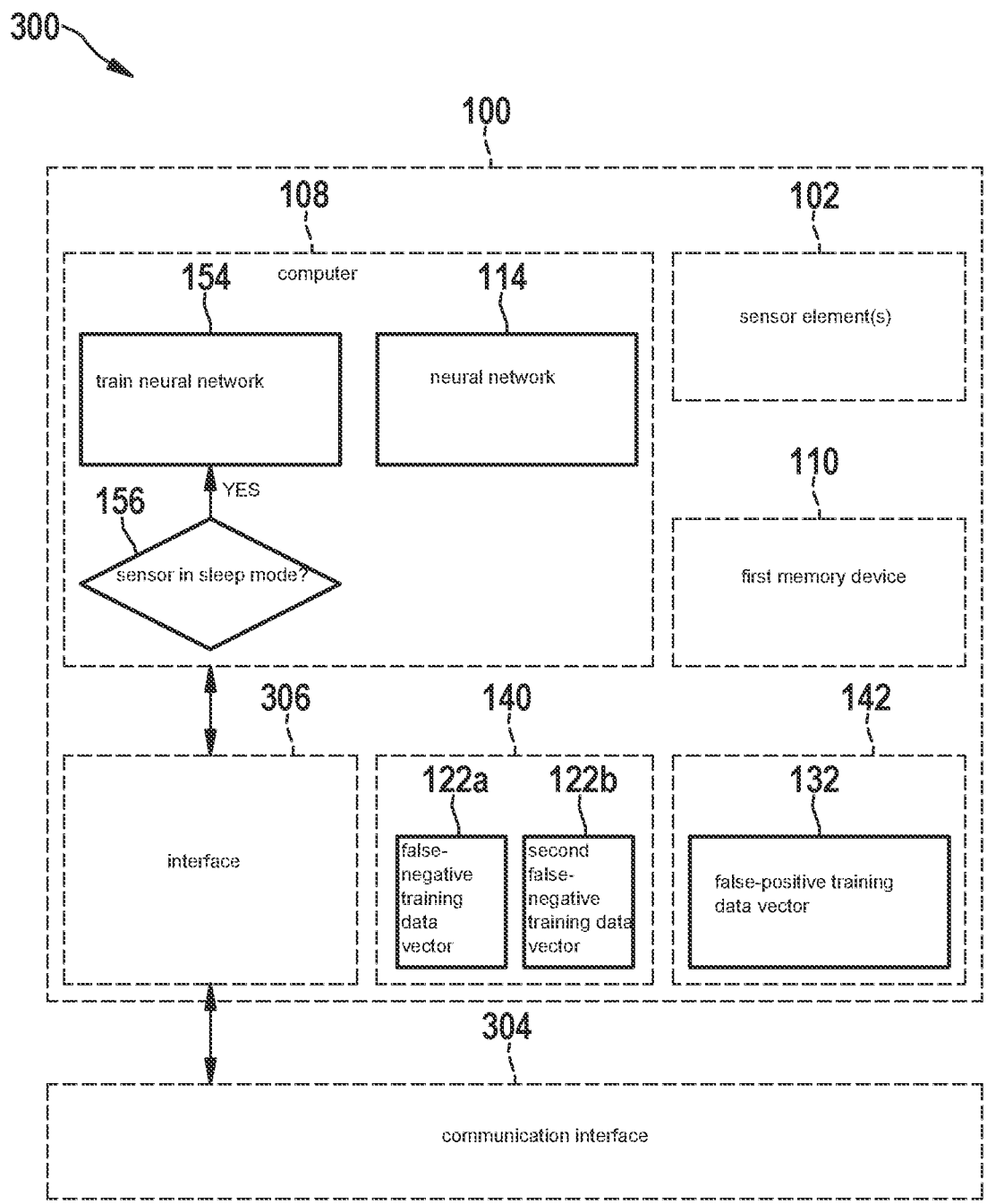

FIG. 3A and FIG. 3B show a system 300 including sensor 100 according to various specific embodiments. System 300 may include an execution unit 302. System 300 may include a communication unit 304. Sensor 100 may further include an interface 306. Interface 306 of sensor 100 and communication unit 304 may be configured in such a way that data (for example, instructions) may be transmitted from sensor 100 to communication unit 304 and from communication unit 304 to the sensor. For example, interface 306 may be a wired interface (for example, a serial interface such as, for example, serial peripheral interface, SPI) or a wireless interface (for example, WLAN, for example, Bluetooth, etc.) for communication with communication unit 304. Communication unit 304 may be further configured to receive data from execution unit 302 and to transmit data to execution unit 302. Computer 108 of sensor 100 may be configured to ascertain instructions 120. Computer 108 may be configured to transmit instructions 120 with the aid of interface 306 to communication unit 304. Communication unit 304 may be configured to transmit instructions 120 to execution unit 302. Execution unit 302 may be configured, in response to instructions 120 received from sensor 100, to carry out 308 the control action assigned to the instructions or assigned control actions of the device.

According to various specific embodiments, the device may, for example, be a smartphone, a wearable (for example, a device worn on the body and/or on the head such as, for example, an intelligent article of clothing, a smartwatch, intelligent glasses, etc.), an intelligent headphone, etc.

The device may include system 300. For example, the device may be a smartwatch and the smartwatch may include sensor 100. For example, sensor 100 may transmit instructions for carrying out a control action of the smartwatch to execution unit 302.

According to various specific embodiments, a device may include sensor 100, the unit not including the device. For example, the unit may be a smartphone and the device may be a smartwatch. The smartwatch may include sensor 100. Interface 306 may be a wireless interface. For example, sensor 100 may transmit instructions to execution unit 302 of the smartphone with the aid of the wireless interface for carrying out a control action of the smartphone.

Referring to FIG. 3B, computer 108 of sensor 100 may be configured to receive pieces of information with the aid of interface 306 as to whether the unit is in a sleep mode (for example, computer 108 may ascertain that the user is sleeping based on the ascertained signal of the one or multiple sensor elements 102). Computer 108 of sensor 100 may be configured to receive pieces of information with the aid of interface 306 as to whether the unit is in a battery charging mode. According to various specific embodiments, computer 108 may be configured to additionally train 154 neural network 114 if computer 108 ascertains that the unit is in the sleep mode and/or in the battery charging mode ("Yes" in 156).

Figure 4:
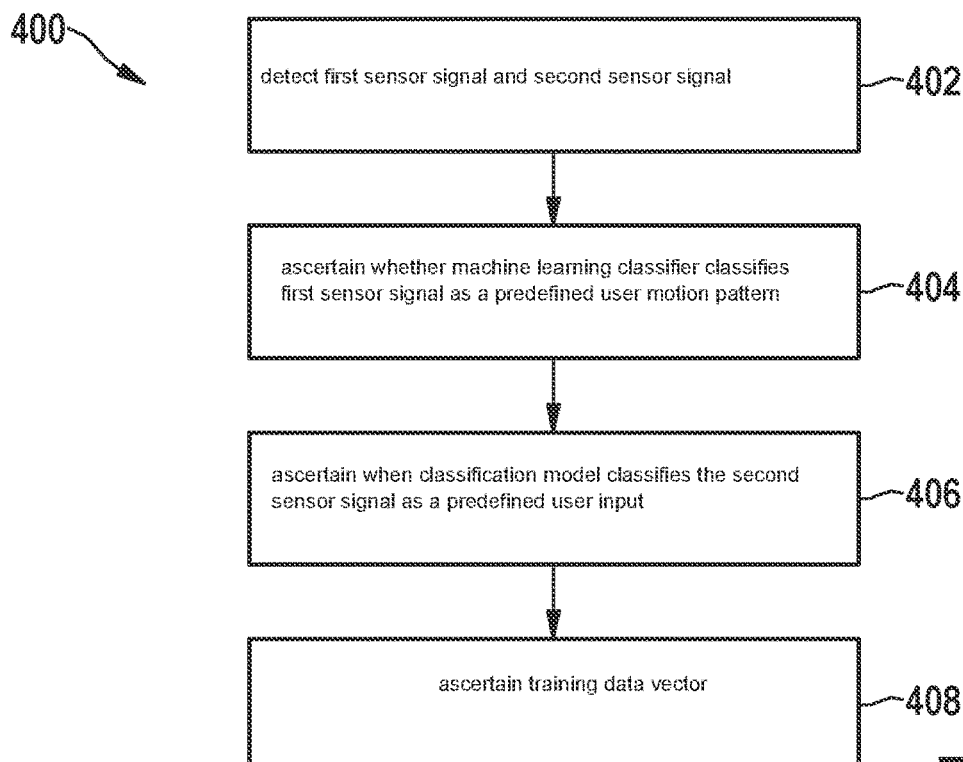
FIG. 4 shows a method for generating training data for a machine learning classifier in a sensor according to various specific embodiments of the present invention.

FIG. 4 shows a method 400 for generating training data for a machine learning classifier in a sensor according to various specific embodiments.

Method 400 may include (in 402) a detection of a first sensor signal and of a second sensor signal with the aid of the sensor.

Method 400 may include (in 404) an ascertainment whether the machine learning classifier, in response to an input of the first sensor signal, classifies the first sensor signal as a predefined user motion pattern.

Method 400 may include (in 406) an ascertainment whether a classification model, in response to an input of the second sensor signal, classifies the second sensor signal as a predefined user input. The user input may be assigned to the user motion pattern.

Method 400 may include (in 408) an ascertainment of a training data vector for the machine learning classifier if the second sensor signal has been classified as the predefined user input and if the first sensor signal has not been classified as the predefined user motion pattern.

Figure 5:
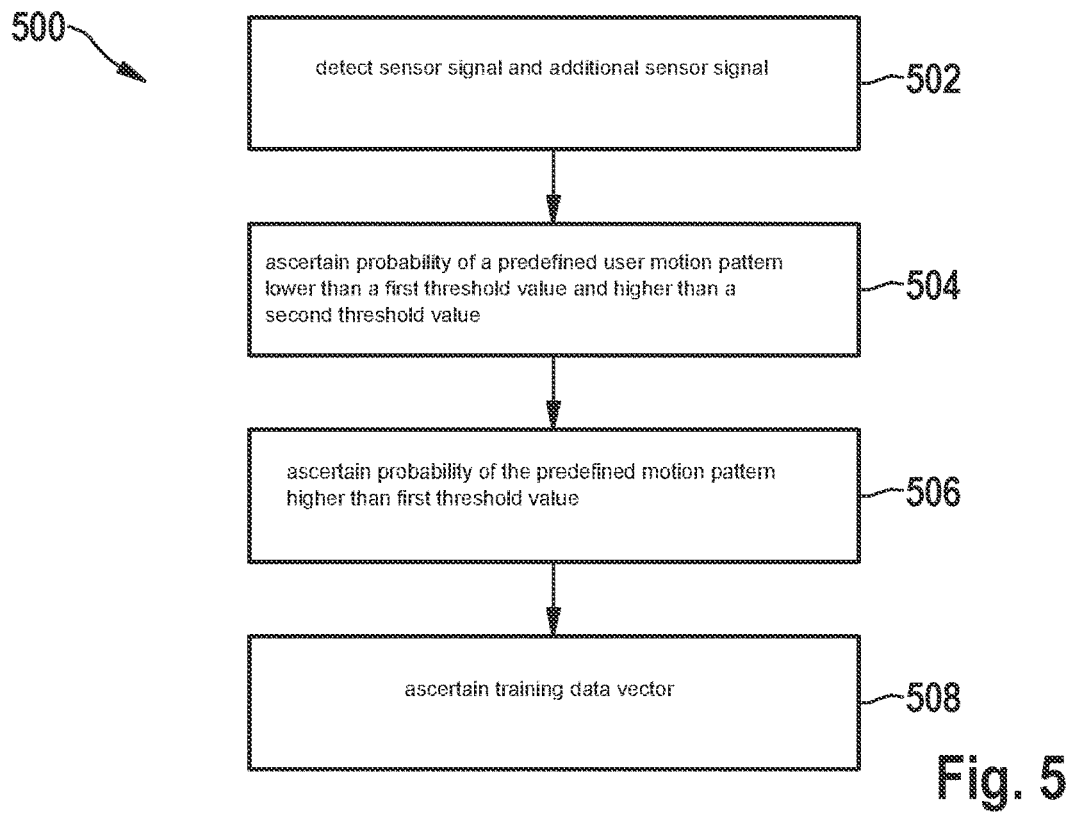
FIG. 5 shows a method for generating training data for a machine learning classifier in a sensor according to various specific embodiments of the present invention.

FIG. 5 shows a method 500 for generating training data for a machine learning classifier in a sensor according to various specific embodiments.

Method 500 may include (in 502) a detection of a sensor signal and of an additional sensor signal with the aid of the sensor.

Method 500 may include (in 504) an ascertainment whether the machine learning classifier, in response to an input of the sensor signal, ascertains a probability of a predefined user motion pattern lower than a predefined first probability threshold value and greater than a predefined second probability threshold value.

Method 500 may include (in 506) an ascertainment whether the machine learning classifier, in response to an input of the additional sensor signal, ascertains a probability of the predefined user motion pattern greater than the predefined first probability threshold value.

Method 500 may include (in 508) an ascertainment of a training data vector for the machine learning classifier if the probability of the predefined user motion pattern ascertained in response to the input of the sensor signal into the machine learning classifier is lower than the predefined first probability threshold value and greater than the predefined second probability threshold value, and if the probability of the predefined user motion pattern ascertained in response to the input of the additional sensor signal into the machine learning classifier is greater than the predefined first probability threshold value. The training data vector may include the sensor signal and the user motion pattern.

What is claimed is:

1. A method for generating training data for a machine learning classifier in a sensor, comprising:
    detecting a first sensor signal and a second sensor signal using the sensor;

ascertaining whether the machine learning classifier, in response to an input of the first sensor signal, classifies the first sensor signal as a predefined user motion pattern;

ascertaining whether a classification model, in response to an input of the second sensor signal, classifies the second sensor signal as a predefined user input for controlling a device, the user input being assigned to the user motion pattern; and ascertaining a training data vector for the machine learning classifier when the second sensor signal has been classified as the predefined user input, and when the first sensor signal has not been classified as the user motion pattern, the training data vector including the first sensor signal and the user motion pattern, the training data vector is a false-negative training data vector;

the ascertainment of whether the machine learning classifier, in response to an input of the first sensor signal, classifies the first sensor signal as a predefined user motion pattern, includes:
  ascertaining, in response to an input of the first sensor signal into the machine learning classifier, a probability of every predefined user motion pattern of a plurality of predefined user motion patterns,
  ascertaining the first sensor signal as the predefined user motion pattern if the probability ascertained for one user motion pattern of the plurality of user motion patterns is greater than a predefined first probability threshold value;

the method further comprises:
ascertaining a false-positive training data vector for the machine learning classifier when the second signal has not been classified as the user input, and when the probability ascertained for the user motion pattern of the plurality of user motion patterns assigned to the user input is lower than the predefined first probability threshold value and is greater than a predefined second probability threshold value, the false-positive training data vector including the first sensor signal as well as the user motion pattern assigned to the user input.

2. The method as recited in claim 1, wherein:
the sensor includes a plurality of sensor elements, and the detection of the first sensor signal and of the second sensor signal with the aid of the sensor includes:
  detecting one or multiple first sensor signals with the aid of one or multiple sensor elements of the plurality of sensor elements, and
  detecting one or multiple second sensor signals with the aid of one or multiple sensor elements of the plurality of sensor elements;
the ascertainment of whether the machine learning classifier, in response to an input of the first sensor signal, classifies the first sensor signal as the predefined user motion pattern, includes:
  ascertaining whether the machine learning classifier, in response to the input of the one or multiple first sensor signals, classifies the one or multiple first sensor signals as the predefined user motion pattern; and
the ascertainment of whether the classification model, in response to the input of the second sensor signal, classifies the second sensor signal as the predefined user input for controlling a device, includes:
  ascertaining whether the classification model, in response to an input of the one or multiple second sensor signals, classifies the one or multiple second sensor signals as the predefined user input.

3. The method as recited in claim 1, further comprising:
transmitting instructions for controlling the device to the device: when the second sensor signal has been classified as the predefined user input, and/or when the first sensor signal has been classified as the user motion pattern.

4. The method as recited in claim 1, further comprising:
detecting a third sensor signal using the sensor;
ascertaining whether the machine learning classifier, in response to an input of the third sensor signal, classifies the third sensor signal as the predefined user motion pattern; and
transmitting the instructions for controlling the device to the device when the machine learning classifier classifies the third sensor signal as the user motion pattern.

5. The method as recited in claim 1, wherein the ascertainment of whether the machine learning classifier, in response to an input of the first sensor signal, classifies the first sensor signal as a predefined user motion pattern, includes:
  ascertaining, in response to an input of the first sensor signal into the machine learning classifier, a probability of every predefined user motion pattern of a plurality of predefined user motion patterns;
  ascertaining the first sensor signal as the predefined user motion pattern when the probability ascertained for one user motion pattern of the plurality of user motion patterns is greater than a predefined first probability threshold value.

6. The method as recited in claim 1, wherein the machine learning classifier is a pre-trained machine learning classifier.

7. The method as recited in claim 6, further comprising additional training of the machine learning classifier using the training data vector.

8. The method as recited in claim 7, wherein:
the detection of the first sensor signal and of the second sensor signal with the using the sensor includes:
  detecting the first sensor signal in a first time range, and
  detecting the second sensor signal in a second time range, the first time range starting before the second time range;
the additional training of the machine learning classifier using the training data vector includes:
  pre-processing the first sensor signal assigned to the training data vector in such a way that the first time range of the first sensor signal is reduced to a time range that is shorter than the first time range, and
  additionally training the machine learning classifier using the pre-processed first sensor signal and the user motion pattern assigned to the training data vector.

9. The method as recited in claim 1, further comprising:
detecting a third sensor signal using the sensor; and
ascertaining, in response to an input of the third sensor signal into the machine learning classifier, a probability of every predefined user motion pattern of a plurality of predefined user motion patterns;
wherein the false-positive training data vector for the machine learning classifier is ascertained when:
  the second sensor signal has not been classified as the user input,
  in response to the input of the first sensor signal into the machine learning classifier, the probability ascertained for user motion pattern of the plurality of user motion patterns assigned to the user input is lower than the predefined first probability threshold value and is greater than the predefined second probability threshold value, and in response to the input of the third sensor signal into the machine learning classifier, the probability ascertained for the user motion pattern of the plurality of user motion patterns assigned to the user input is lower than the predefined first probability threshold value.

10. A non-volatile memory medium on which are stored program instructions for generating training data for a machine learning classifier in a sensor, the program instructions, when executed by a computer, causing the computer to perform the following steps:

detecting a first sensor signal and a second sensor signal using the sensor;

ascertaining whether the machine learning classifier, in response to an input of the first sensor signal, classifies the first sensor signal as a predefined user motion pattern;

ascertaining whether a classification model, in response to an input of the second sensor signal, classifies the second sensor signal as a predefined user input for controlling a device, the user input being assigned to the user motion pattern; and ascertaining a training data vector for the machine learning classifier when the second sensor signal has been classified as the predefined user input, and when the first sensor signal has not been classified as the user motion pattern, the training data vector including the first sensor signal and the user motion pattern, the training data vector is a false-negative training data vector;

the ascertainment of whether the machine learning classifier, in response to an input of the first sensor signal, classifies the first sensor signal as a predefined user motion pattern, includes:

ascertaining, in response to an input of the first sensor signal into the machine learning classifier, a probability of every predefined user motion pattern of a plurality of predefined user motion patterns, ascertaining the first sensor signal as the predefined user motion pattern if the probability ascertained for one user motion pattern of the plurality of user motion patterns is greater than a predefined first probability threshold value;

the method further comprises:

ascertaining a false-positive training data vector for the machine learning classifier when the second signal has not been classified as the user input, and when the probability ascertained for the user motion pattern of the plurality of user motion patterns assigned to the user input is lower than the predefined first probability threshold value and is greater than a predefined second probability threshold value, the false-positive training data vector including the first sensor signal as well as the user motion pattern assigned to the user input.

11. A sensor configured to generating training data for a machine learning classifier in the sensor, the sensor configured to:

detect a first sensor signal and a second sensor signal using the sensor;

ascertain whether the machine learning classifier, in response to an input of the first sensor signal, classifies the first sensor signal as a predefined user motion pattern;

ascertain whether a classification model, in response to an input of the second sensor signal, classifies the second sensor signal as a predefined user input for controlling a device, the user input being assigned to the user motion pattern; and ascertain a training data vector for the machine learning classifier when the second sensor signal has been classified as the predefined user input, and when the first sensor signal has not been classified as the user motion pattern, the training data vector including the first sensor signal and the user motion pattern, the training data vector is a false-negative training data vector;

for the ascertainment of whether the machine learning classifier, in response to an input of the first sensor signal, classifies the first sensor signal as a predefined user motion pattern, the sensor is configured to:

ascertain, in response to an input of the first sensor signal into the machine learning classifier, a probability of every predefined user motion pattern of a plurality of predefined user motion patterns, ascertain the first sensor signal as the predefined user motion pattern if the probability ascertained for one user motion pattern of the plurality of user motion patterns is greater than a predefined first probability threshold value;

the sensor further configured to:

ascertain a false-positive training data vector for the machine learning classifier when the second signal has not been classified as the user input, and when the probability ascertained for the user motion pattern of the plurality of user motion patterns assigned to the user input is lower than the predefined first probability threshold value and is greater than a predefined second probability threshold value, the false-positive training data vector including the first sensor signal as well as the user motion pattern assigned to the user input.

* * * * *